US005655114A

United States Patent [19]

Taniai et al.

[11] Patent Number: 5,655,114
[45] Date of Patent: Aug. 5, 1997

[54] SYSTEM AND DEVICE FOR PREFETCHING COMMAND AND PARAMETERS TO BE PROCESSED WITH LEAST FREQUENT BUS ACCESS

[75] Inventors: Takayoshi Taniai, Kawasaki; Hajime Sato, Tokyo; Hidetoshi Shimura; Tadashi Saitoh, both of Kawasaki; Shinji Oyamada, Yokohama, all of Japan

[73] Assignees: Fujitsu Limited; Fujitsu Microcomputer Systems Limited, both of Kawasaki, Japan

[21] Appl. No.: 453,475

[22] Filed: May 30, 1995

Related U.S. Application Data

[63] Continuation of Ser. No. 968,471, Oct. 29, 1979, abandoned, which is a continuation of Ser. No. 494,227, Mar. 15, 1990, abandoned.

[30] Foreign Application Priority Data

| Mar. 15, 1989 | [JP] | Japan | 1-62832 |
| Mar. 15, 1989 | [JP] | Japan | 1-62833 |
| Mar. 15, 1989 | [JP] | Japan | 1-62834 |
| Mar. 16, 1989 | [JP] | Japan | 1-62032 |
| Mar. 20, 1989 | [JP] | Japan | 1-68377 |
| Mar. 20, 1989 | [JP] | Japan | 1-68378 |
| Apr. 26, 1989 | [JP] | Japan | 1-108370 |

[51] Int. Cl.$^6$ .................................... G06F 9/38
[52] U.S. Cl. ........................... 395/580; 395/584
[58] Field of Search ........................ 395/580, 584

[56] References Cited

U.S. PATENT DOCUMENTS

| 3,736,567 | 5/1973 | Loton et al. | 340/172.5 |
| 4,037,213 | 7/1977 | Atkins et al. | |
| 4,393,457 | 7/1983 | New. | |
| 4,424,563 | 1/1984 | Lynch. | |
| 4,583,163 | 4/1986 | Kobayashi et al. | 395/250 |
| 4,616,313 | 10/1986 | Aoyagi. | |
| 4,644,463 | 2/1987 | Hotchkin et al. | |
| 4,648,034 | 3/1987 | Heninger. | |

(List continued on next page.)

FOREIGN PATENT DOCUMENTS

| 0 079 393 | 5/1983 | European Pat. Off. . |
| 0 261 685 | 3/1988 | European Pat. Off. . |
| 0 284 364 | 9/1988 | European Pat. Off. . |

OTHER PUBLICATIONS

Mano; "Computer System Architecture"; 1982 by Prentice–Hall; p. 218.

U.S. application No. 07/400,298, Taniai et al., filed Aug. 29, 1989 Assignee Fujitsu Limited and Fujitsu Microcomputer Systems Limited.

*Primary Examiner*—Krisna Lim
*Attorney, Agent, or Firm*—Staas & Halsey

[57] ABSTRACT

A data processing device contains art execution circuit and a data buffer circuit which stores one or more commands and/or one or more parameters which are prefetched, until each of the commands and parameters is read out by the execution circuit. The execution circuit inputs the oldest command stored in the data buffer circuit when an execution of a preceding command is completed, inputs one or more parameters stored in the data buffer circuit when the command input therein requests the parameters, and executes the command input therein, using the parameters when the parameters are input therein. The device further contains a circuit for detecting whether or not there is enough vacant space in the data buffer circuit in which a further command and/or a parameter can be stored, and another circuit for detecting a state of the data buffer circuit in which state the data buffer circuit does not store data including a command and/or a parameter, which is necessary for a next operation in the execution circuit. A prefetch control circuit, provided in either in the device or outside of the device, starts the prefetch operation and continues successive prefetch operations when the second state is detected, and stops the prefetch operation when the first state is detected. The system using the device contains a memory which stores the commands and parameters in the order of execution in the execution circuit.

55 Claims, 25 Drawing Sheets

U.S. PATENT DOCUMENTS

| | | | |
|---|---|---|---|
| 4,701,844 | 10/1987 | Thompson et al. | 364/200 |
| 4,707,784 | 11/1987 | Ryan et al. | 364/200 |
| 4,713,752 | 12/1987 | Tone | 395/250 |
| 4,714,994 | 12/1987 | Oklobdzija et al. | 395/250 |
| 4,719,568 | 1/1988 | Carrubba et al. | 364/200 |
| 4,763,242 | 8/1988 | Lee et al. . | |
| 4,847,748 | 7/1989 | Yamahata et al. | 395/375 |
| 4,847,755 | 7/1989 | Morrison et al. . | |
| 4,847,756 | 7/1989 | Ito et al. | 364/200 |
| 4,866,609 | 9/1989 | Calta et al. | 395/250 |
| 4,876,642 | 10/1989 | Gibson | 395/250 |
| 4,896,264 | 1/1990 | Boddie . | |
| 4,933,841 | 6/1990 | Mori et al. | 395/375 |
| 4,992,932 | 2/1991 | Ohshima | 395/375 |
| 4,994,962 | 2/1991 | Mageau et al. . | |
| 5,043,883 | 8/1991 | Inouchi et al. . | |
| 5,063,497 | 11/1991 | Cutler et al. . | |

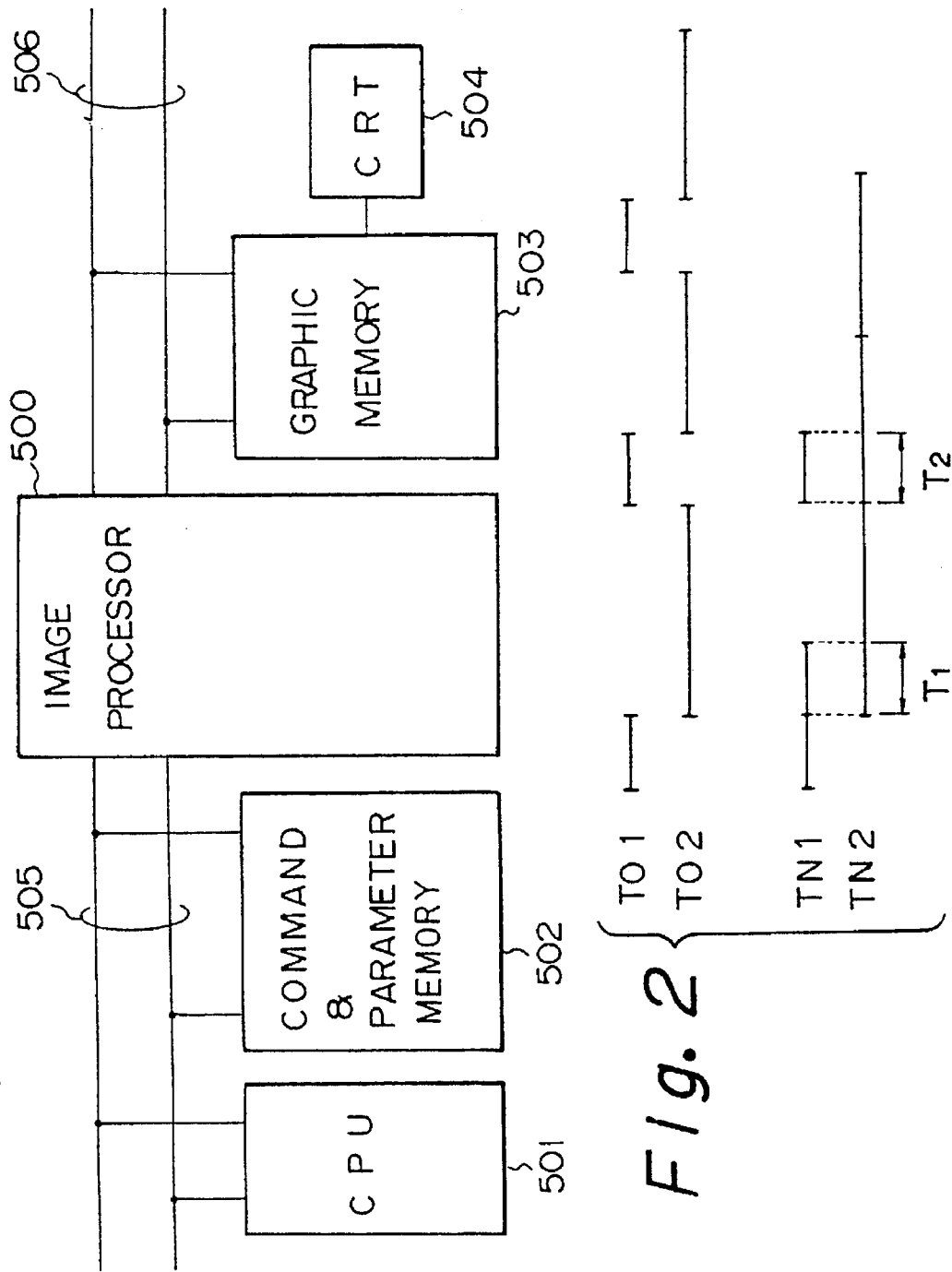

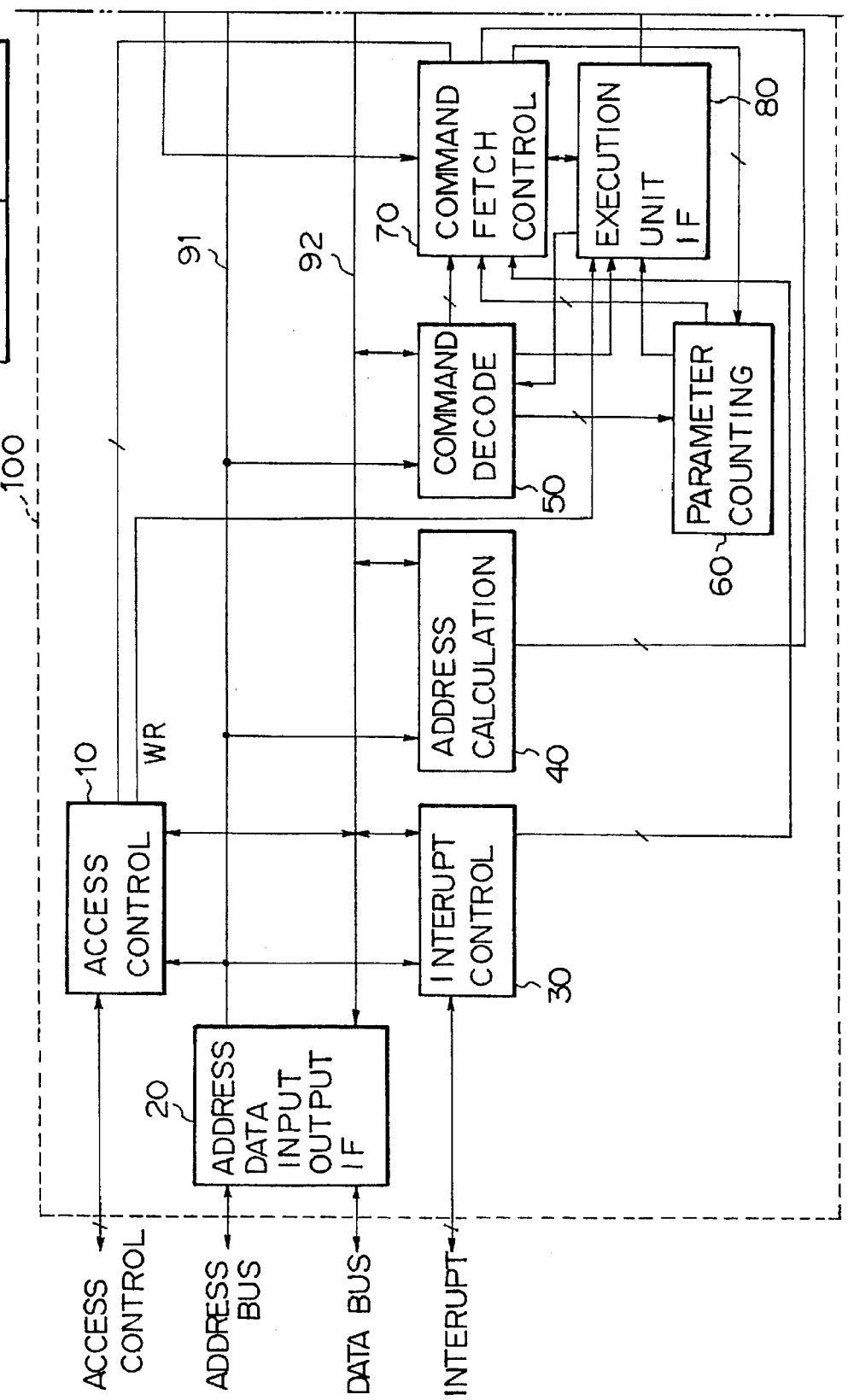

Fig. 5
PRIOR ART

| | |
|---|---|
| 0000 | LINE SEGMENT GENERATING COMMAND |
| 0001 | STARTING POINT $(X_{S0}, Y_{S0})$ |
| 0010 | ENDING POINT $(X_{E0}, Y_{E0})$ |
| 0011 | LINE SEGMENT GENERATING COMMAND |
| 0100 | STARTING POINT $(X_{S1}, Y_{S1})$ |
| 0101 | ENDING POINT $(X_{E1}, Y_{E1})$ |
| 0110 | LINE SEGMENT GENERATING COMMAND |
| 0111 | STARTING POINT $(X_{S3}, Y_{S3})$ |
| 1000 | ENDING POINT $(X_{E3}, Y_{E3})$ |
| 1001 | LINE SEGMENT GENERATING COMMAND |
| 1010 | STARTING POINT $(X_{S4}, Y_{S4})$ |
| 1011 | ENDING POINT $(X_{E4}, Y_{E4})$ |

Fig. 8

| Addr | Field | Value | |
|---|---|---|---|
| 0000 | LINE SEGMENT GENERATING COMMAND | | |
| 0001 | STARTING POINT | $(X_{S0}, Y_{S0})$ | BASIC SET OF BP(=2) PARAMETERS |
| 0010 | ENDING POINT | $(X_{E0}, Y_{E0})$ | |
| 0011 | STARTING POINT | $(X_{S1}, Y_{S1})$ | |
| 0100 | ENDING POINT | $(X_{E1}, Y_{E1})$ | |
| 0101 | STARTING POINT | $(X_{S3}, Y_{S3})$ | |
| 0110 | ENDING POINT | $(X_{E3}, Y_{E3})$ | |
| 0111 | STARTING POINT | $(X_{S4}, Y_{S4})$ | |
| 1000 | ENDING POINT | $(X_{E4}, Y_{E4})$ | |
| | ⋮ | | |
| | STARTING POINT | $(X_{S,n-1}, Y_{S,n-1})$ | |
| | ENDING POINT | $(X_{E,n-1}, Y_{E,n-1})$ | |

TOTAL NUMBER OF BASIC SETS NP(=n)

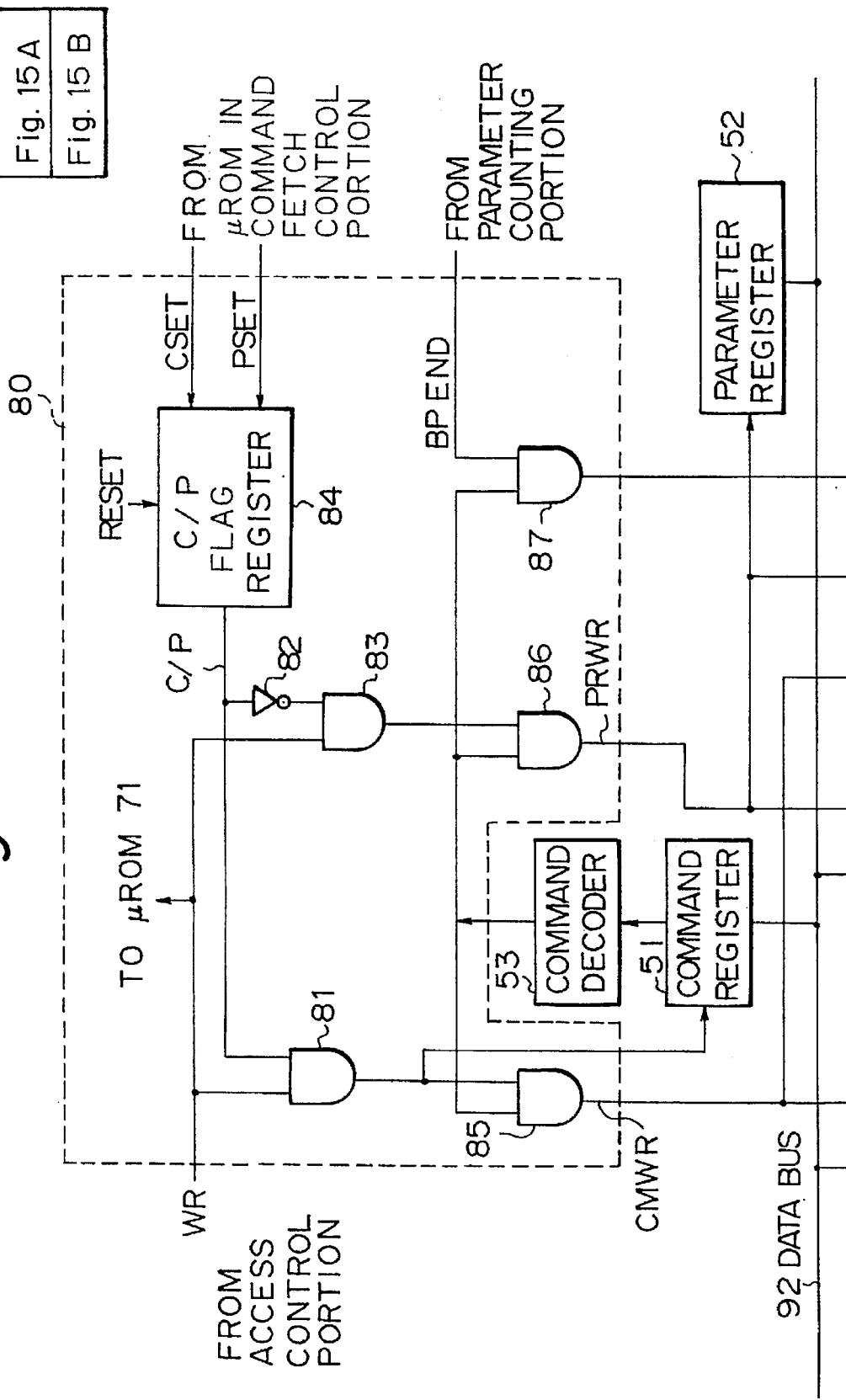

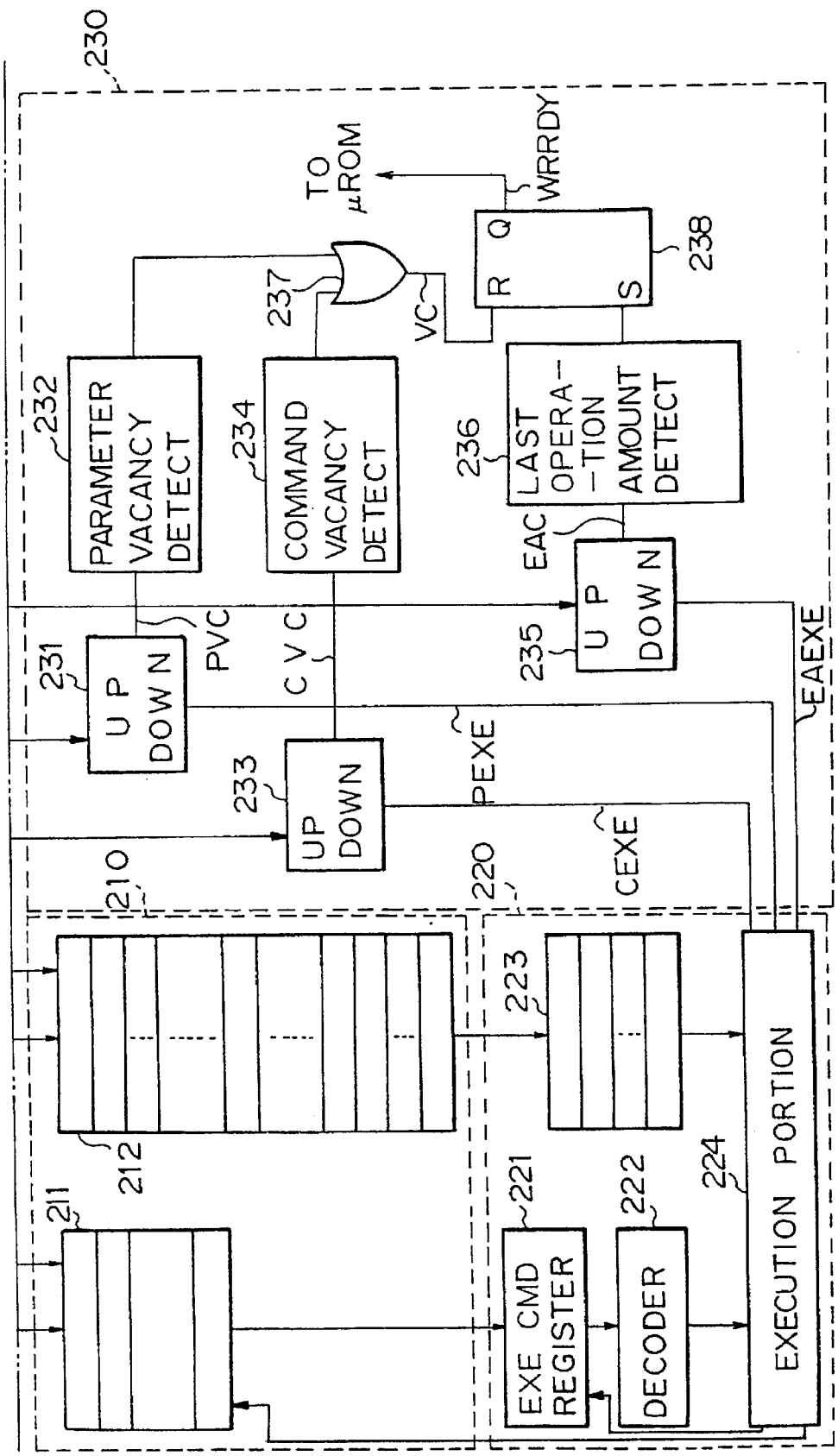

SYSTEM AND DEVICE FOR PREFETCHING COMMAND AND PARAMETERS TO BE PROCESSED WITH LEAST FREQUENT BUS ACCESS

This application is a continuation, of application Ser. Nos. 07/494,227 and 07/968,741, filed Mar. 15, 1990 and Oct. 29, 1992, respectively, now abandoned.

CROSS-REFERENCE TO RELATED APPLICATIONS

This application is related to application Ser. No. 07/400,298 filed Aug. 29, 1989 and entitled "DATA CONTROL DEVICE AND SYSTEM USING THE SAME," and to application Ser. No. 07/452,588 filed Dec. 19, 1989 and entitled "IMAGE PROCESSING APPARATUS AND A SYSTEM USING THE SAME," the foregoing related applications having common inventors, and included as well among the joint inventors of the subject application, and all said applications being commonly assigned to FUJITSU LIMITED and FUJITSU MICROCOMPUTER SYSTEMS LIMITED.

BACKGROUND OF THE INVENTION

(1) Field of the Invention

The present invention relates to a data processing system wherein data prefetch is carried out, and a data processing device which is used in the system, having a function for prefetching data, and including a buffer memory wherein prefetched data is temporarily stored. The data which is prefetched includes commands and parameters which accompany respective commands. The parameters include numerical information, and are respectively processed in accordance with the corresponding commands.

The present invention is particularly advantageous for a data processing device which is used in a data processing system, which is connected to a common bus, and which shares the use of the common bus with other bus masters such as a central processor. Further, the present invention is applicable to a co-processor which is provided to take over and perform a part of the work of a central processor to enhance the capability of the central processor, and to a co-processor system which contains the above co-processor therein. Typical examples of such co-processors are an image processor and an arithmetic processor. In addition, the above co-processor may be constructed within a LSI chip as a peripheral LSI which cooperates with a microprocessor unit (MPU).

(2) Description of the Related Art

In data processing devices which process data, the data which is to be processed is supplied from a memory under control of a central processor, or is fetched from the memory by the data processing device itself, for example, by a DMA operation. In the data processing device having a function for prefetching data, the prefetched data is temporarily stored in a command and parameter buffer memory which is provided therein; in both cases the data is supplied under control of a central processor, and is prefetched by the data processing device itself.

In a data processing system wherein a common bus is shared by a plurality of bus masters, a bus arbitration is carried out by a bus arbiter for controlling use of the common bus by the plurality of bus masters, and it takes a considerable time to carry out the operation of the bus arbitration. During the operation of the bus arbitration, data transfer cannot be carried out using the bus. Therefore, when the frequency of the bus arbitration increases, the efficiency regarding the use of the bus, and thus the efficiency of the system, is lowered.

Thus, when the above data processing device, having a function for prefetching data, is incorporated in the above data processing system wherein a common bus is shared by a plurality of bus masters, reduction of the frequency of the prefetch operation is required to prevent the lowering of the efficiency of the system.

However, in the prior art, the above data prefetch in the data processing device is carried out every time a vacancy for storing new data is generated in the command and parameter buffer memory. The vacancy in the command and parameter buffer memory is generated every time an amount of data is read out from the command and parameter buffer memory, and is processed in an executing portion of the data processing device. When the above memory, wherein the data to be processed is stored, is connected through the above common bus, operations for obtaining an allowance to use the bus with regard to the bus arbiter, are carried out every time before the beginning of the prefetch operation. Therefore, in the conventional data processing device, the frequency of bus arbitration is increased by the above prefetch procedure.

In addition, in the prior art, the prefetch is carried out simply in the order of successive addresses in the memory wherein the data to be processed is stored, since, generally, the data to be processed is stored in the order of the processing. However, the data may include a branch command. When a branch command is processed in the data processing device, in most cases, the data which is to be processed in the next step is not the data which is stored in the address next to the branch command in the above memory address, and therefore, is not the data which has been prefetched following the branch command and stored in the command and parameter buffer memory. Namely, when a branch command appears in the data which is to be processed, the prefetched data following the branch command is, in most cases, useless. This means that useless prefetch operations and the useless bus arbitrations are carried out in the conventional data processing device, and these useless bus arbitrations lower the efficiency of the system.

Further, generally, the above data includes commands, each of which instructs what kind of processing is to be carried out, and one or more parameters which accompany the command and are to be used for the processing. Accordingly, in the prior art, the data which is fetched in the data processing device is comprised of a succession of pairs of a command and accompanying set of parameters. However, the pairs including the same command and different parameters, often are successively fetched. The fetched command is decoded at the first stage of the processing of each command in the data processing device even while data (the above pairs) including the same commands are successively processed. It is not desirable to repeat the prefetch and decoding of the same command, in view of the above-mentioned bus efficiency and the efficiency of the data processing device itself.

SUMMARY OF THE INVENTION

A first object of the present invention is to provide a data processing system carrying out data prefetch, and a data processing device used in the system, wherein the frequency, of the operations for obtaining an allowance to use a common bus, is reduced.

A second object of the present invention is to provide a data processing system carrying out data prefetch, and a data processing device used in the system, having a function for prefetching data and including a command and parameter buffer memory for storing the prefetched data, wherein the speed and efficiency of data processing is improved.

A third object of the present invention is to provide a data processing system carrying out data prefetch, and a data processing device used in the system, which data processing device takes over and performs a part of the work of a central processor, thereby to enhance the capability of the central processor when initializing the registers therein.

A fourth object of the present invention is to provide a data processing device having a function for prefetching data, and including a command and parameter buffer memory for storing the prefetched data, wherein information, on data which is processed, is held when an exceptional condition arises.

According to the present invention, there is provided a data processing device containing an executing portion and a data buffer circuit. The above data buffer circuit stores one or more commands and/or one or more parameters which are prefetched, until each of the commands and parameters stored therein is read out by the above executing portion. The above executing portion inputs a command, which is the oldest one of the commands stored in the data buffer circuit, when the execution of a preceding command is completed, inputs one or more parameters stored in the data buffer circuit when the corresponding command, as input therein, requests the parameters, and executes the command as input therein, using the parameters when the parameters are input therein. The above data processing device further contains an insufficient space detecting circuit for detecting a first state of the data buffer circuit in which state there is not enough vacant space in the data buffer circuit in which a further command and/or a parameter can be stored, and a least data detecting circuit for detecting a second state of the data buffer circuit in which second state the data buffer circuit does not store data including a command and/or a parameter, which is necessary for a next operation in the above executing circuit. The system using the above device contains a memory which stores the above commands and parameters in the order of execution thereof by the executing circuit. A prefetch control circuit is provided either in the device or outside of the device.

A first additional feature of the present invention is that the above prefetch control circuit comprises a branch command detecting circuit for detecting a branch command in prefetched commands, and the prefetch control circuit stops the prefetch operation until a result of the execution of the branch command is obtained in the execution circuit.

A second additional feature of the present invention is that, in the above data processing system containing the above data processing device, when successive executions of a command by the data processing device are required, which executions each use a parameter set comprised of one or more parameters, the command is stored in the command and parameter memory, followed by the parameter sets which are respectively used in successive executions of the command; and the command contains information on the number of the parameter sets, and information on the data length of each of the parameter sets.

A third additional feature of the present invention is that, in the above data processing device, the above prefetch control circuit comprises an address calculation circuit for calculating an address for prefetching a command or a parameter, and the address calculation circuit comprises a command address first-in, first-out (FIFO) memory and an executing command address register. The above command address FIFO memory inputs the output of the address calculation circuit, and outputs its own oldest content into the executing command address register thereby to hold therein the address of a command which is currently in execution, wherein the content of the executing command address register is renewed to respond to an input of a new command into the execution circuit.

A fourth additional feature of the present invention is that, in the above data processing device, the above prefetch control circuit comprises a command register for temporarily holding a prefetched command, and the command register comprises a command FIFO memory and an executing command register. The command FIFO memory inputs the output of the command register, and outputs its own oldest content into the executing command register thereby to hold therein a command which is currently in execution, whereupon the content of the executing command register is renewed to respond to an input of a new command into the execution circuit.

A fifth additional feature of the present invention is that the above data processing device further comprises one or more internal registers which are requested to be initialized. One or more initialization commands can be stored in the command and parameter memory, where the initialization commands respectively contain internal addresses of the internal registers, and the initialization commands each can be followed by parameter data which contains initialization, which is to be written into a corresponding internal register in the command and parameter memory. The prefetch control circuit comprises: a command decode circuit for determining whether or not a command fetched from the command and parameter memory is the initialization command; a parameter register for receiving the initialization data therein; and an address field register for holding the internal address contained in the initialization command; an address decoder circuit for decoding its own input and thereby to output an input control signal to the internal register which is addressed by the internal address; a switching circuit for outputting either of an address signal, supplied from outside of the data processing device, and the output of the address field register; and an initialization control circuit for controlling the switching circuit to select the output of the address field register, as its own output, when an initialization command is determined.

A sixth additional feature of the present invention is that, in the above data processing device, the execution circuit has a first port, connected to a first bus through the prefetch control circuit, for inputting the commands and parameters, and a second port, connected to a second bus, for outputting results of the execution.

BRIEF DESCRIPTION OF THE DRAWINGS

In the drawings:

FIG. 1 shows a portion of a data processing system, having a function of processing and displaying image data, to which an embodiment of the present invention is implemented;

FIG. 2 shows timing diagrams of the above fetching operation of the commands and parameters, and the outputting operation of the processed data, in the conventional construction, and in the construction of FIG. 1;

FIGS. 3, 3A and 3B in the composite show a construction of the image processor 500 of FIG. 1 according to an embodiment of the present invention;

FIG. 5 shows an example of the content of the conventional command and parameter memory corresponding to the above command and parameter structure of FIG. 4;

FIG. 8 shows an example of the content of the command and parameter memory 502 corresponding to the above command and parameter structure of FIG. 7;

FIGS. 15, 15A and 15B, and 16 show the constructions of the execution unit interface 80 in the image processor 500, the command and parameter buffer memory for storing the prefetched command sets, and the data amount monitoring circuit provided in the execution unit 200;

FIGS. 17, 17A, 17B, and 17C, in the composite, are a flow chart of the control operation by the micro ROM 71 in the embodiment of the present invention;

DESCRIPTION OF THE PREFERRED EMBODIMENTS (1) The Over-All Data Processing System FIG. 1 shows a portion of a data processing system, having a function of processing and displaying image data, in which an embodiment of the present invention is implemented.

In FIG. 1, reference numeral 501 denotes a CPU, 502 denotes a command and parameter memory, 500 denotes an image processor, 503 denotes a graphic memory, 504 denotes a CRT display device, 505 denotes a system bus, and 506 denotes a graphic bus.

Figure 3B:
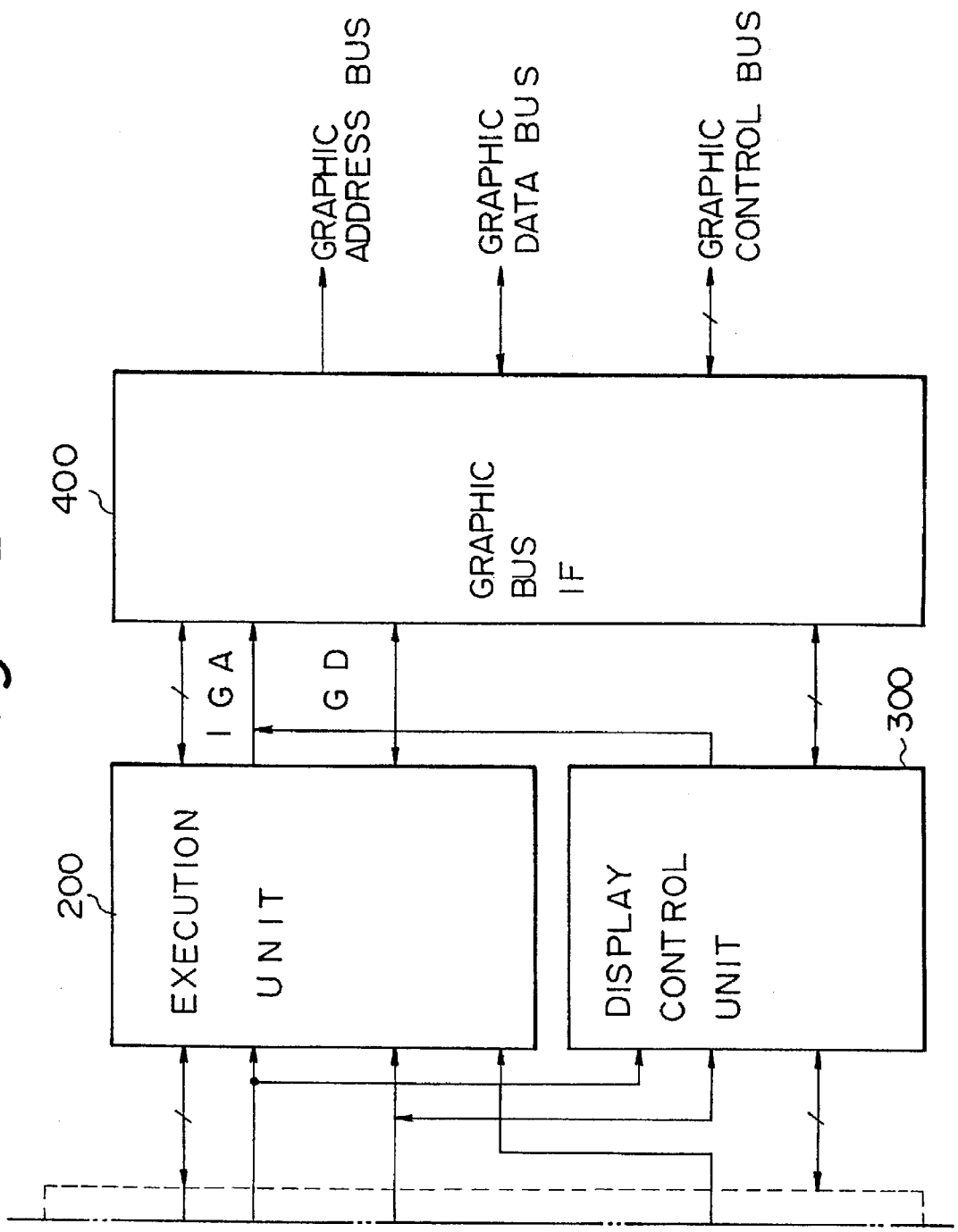

The image processor 500 is provided for carrying out processing of image data to display an image according to an instruction from the CPU 501, e.g., to draw a drawing on the display device, or the like.

Commands and parameters accompanying the respective commands, which are fetched and processed in the image processor 500, are stored in the command and parameter memory 502, basically in the order of the processing. The content of the command and parameter memory 502 is written by the CPU 501 in advance of the operation of the image processor 500.

The CPU 501, the command and parameter memory 502, and the one side of the image processor 500 are connected to the system bus 505, and the above commands and parameters accompanying the respective commands are fetched through the system bus 505 from the command and parameter memory 502 to the image processor 500.

The graphic memory 503, the CRT display device 504, and the other side of the the image processor 500, are connected to the graphic bus 506 and the processed data, which is in the bit-map form is output from, the the image processor 500 to the graphic memory 503 through the graphic bus 506.

Although not shown, conventionally, all of the CPU 501, the command and parameter memory 502, the image processor 500, the graphic memory 503, and the CRT display device 504 are connected to a common bus, and therefore, the above fetching operation of the commands and parameters and the outputting operation of the processed data cannot be carried out in parallel in the image processor 500 because both the operations use the same bus. However, in the construction as shown FIG. 1, wherein the graphic bus 506 for transferring the processed data is provided separately from the system bus 505 for transferring the command and parameters, the above fetching operation of the commands and parameters and the outputting operation of the processed data can be carried out in parallel in the image processor 500.

FIG. 2 shows timing diagrams of the above fetching operation of the commands and parameters and the outputting operation of the processed data, in the conventional construction and in the construction of FIG. 1.

In FIG. 2, TO1 indicates a timing of the operation for fetching commands and parameters in the conventional construction, TO2 indicates a timing of the operation for outputting the processed data in the conventional construction, TN1 indicates a timing of the operation for fetching commands and parameters in the construction of FIG. 1, and TN2 indicates a timing of the operation for outputting the processed data in the construction of FIG. 1.

As indicated in FIG. 2, the fetching operation of the commands and parameters and the outputting operation of the processed data are carried out in parallel in the construction of FIG. 1, and therefore, a total processing time is reduced.

(3) Overall Construction of Image Processor

FIGS. 3A and 3B show a construction of the image processor 500 of FIG. 1 according to an embodiment of the present invention.

In FIGS. 3A and 3B, reference numeral 100 denotes a prefetch unit, 200 denotes an execution unit, 300 denotes a display control unit, and 400 denotes a graphic bus interface. In the construction of the prefetch unit 100, reference numeral 10 denotes an access control circuit, 20 denotes an address data input/output interface circuit, 30 denotes an interrupt control circuit, 40 denotes an address calculation circuit, 50 denotes a command decoding portion, 60 denotes a parameter counting portion, 70 denotes a command fetch control portion, 80 denotes an execution portion, 91 denotes an internal address bus, and 92 denotes an internal data bus.

The prefetch unit 100 carries out the prefetch operation of commands and parameters from the aforementioned command and parameter memory 502.

The execution unit 200 executes data processing operations using the fetched parameters in accordance with the fetched commands.

The display control unit 300 generates control signals for the CRT display device 504, e.g., horizontal and vertical synchronizing signals.

The graphic bus interface 400 is provided as an interface between the the graphic bus 506 and the above internal circuits of the image processor 500.

In the construction of the prefetch unit 100, command decoding portion 50 receives a prefetched command, and decodes the command. The construction and the operation of the parameter counting portion 60 are explained later. The command fetch control portion 70 comprises a microprogram ROM, and controls the entire operation of the prefetch unit 100. The execution unit interface 80 generates control signals to control the execution unit 200 as explained later.

The address calculation circuit 40 calculates addresses for prefetching commands and parameters from the command and parameter memory 502, under the control of the command fetch control portion 70.

The interrupt control circuit 30 receives interrupts, for example, from the CPU 501 for reading the content of internal registers in the image processor 500, or from the the execution unit 200 to inform of an occurrence of an exceptional condition. These interrupts are transmitted to the the command fetch control portion 70, and the command fetch control portion 70 outputs control signals corresponding to the respective interrupts.

The address data input/output interface circuit 20 is provided as an interface between the system bus 505 and the internal address and data buses 91 and 92. The address calculated in the the address calculation circuit 40 is first output in the internal data bus 92, and the address signal on the internal data bus 92 is switched onto an address bus in the system bus 505 to supply the address signal to components connected thereto.

The access control circuit 10 comprises a DMA controller, and controls a DMA transfer operation for prefetching commands and parameters from the command and parameter memory 502, under the control of the command fetch control portion 70. For example, in the image processor 500, the access control circuit 10 outputs a request for an allowance to use the system bus 505 to the bus arbiter (not shown), as mentioned on page 2, line 7, receives an allowance to use the system bus 505 from the bus arbiter, controls the outputting of the address signal to the command and parameter memory 502, and write timing signal WR to receive and hold a prefetched word, which is prefetched from the command and parameter memory 502.

(4) Conventional Structure of Commands and Parameters

Figure 4:
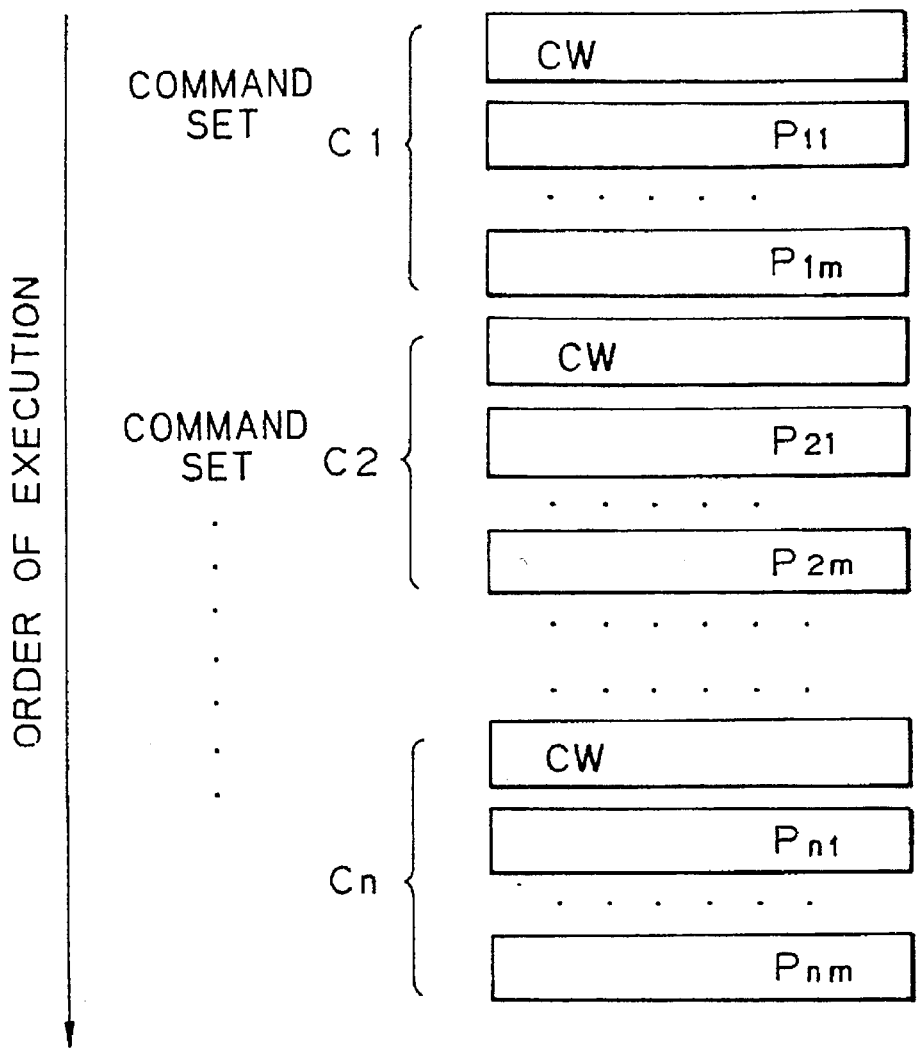
FIG. 4 shows an example of a conventional structure of a series of commands and plural, associated parameters accompanying respective commands.

FIG. 4 shows an example of a conventional structure of a series of commands and parameters accompanying respective commands.

In FIG. 4, C1, C2, ... Cn each denote a command set, CW denotes a command word, and $P_{11}, \ldots P_{1m}, P_{21}, \ldots P_{2m}, \ldots P_{n1}, \ldots P_{nm}$ each denote a parameter word, where "n" is the number of the command sets, and "m" is the number of the parameter words in each command set. Each command set comprises a command word CW, and zero to a plurality of parameter words, and each command word contains an operation code which indicates what the command instructs. A set of parameters, which is contained in the m parameter words $P_{i1}, \ldots P_{im}$ (i=1–m) following each command word CW, is used at the same time for executing one operation in the execution unit 200 in accordance with the command word CW.

FIG. 5 shows an example of the content of the conventional command and parameter memory corresponding to the above command and parameter structure of FIG. 4.

In the example of FIG. 5, a series of command sets for a line segment generating command is shown. In the address 0000, a command word which indicates that the command is a line segment generating command, is stored. In the address 0001, the X and Y coordinates of a starting point $(X_{s0}, Y_{s0})$ are stored, and in the address 0002, the X and Y coordinates of an ending point $(X_{e0}, Y_{e0})$ are stored. In the following addresses 0011, 0100, . . . , similar sets of commands and accompanying parameters to draw line segments of different starting and ending point coordinates are stored.

Figure 6:
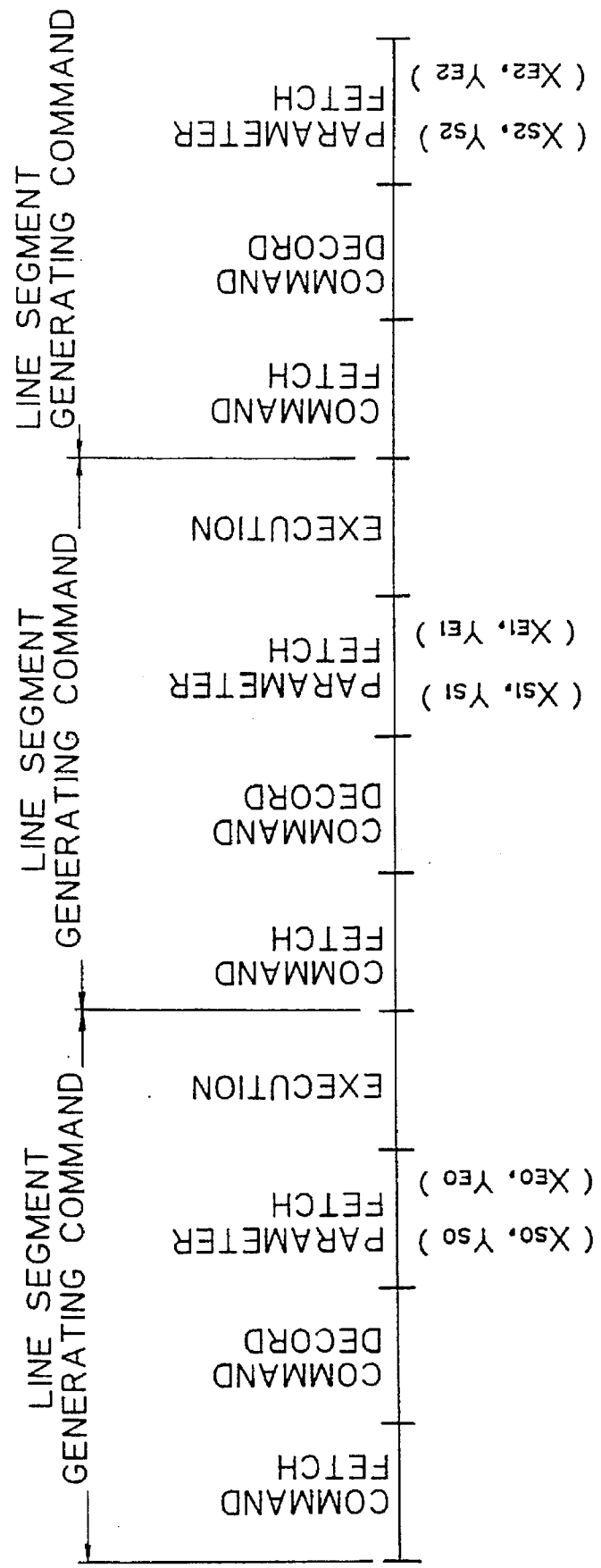
FIG. 6 shows a timing of executing data processing which is instructed by the series of commands and parameters as shown in FIG. 5.

FIG. 6 shows a timing of executing data processing which is instructed by the series of commands and parameters as shown in FIG. 5.

As shown in FIG. 6, in the conventional data processing system wherein commands and parameters supplied to the image processor have a structure as shown in FIG. 5, a command decoding operation is necessary, for a timing interval, before executing each data processing operation of a set of the coordinates of the starting and the ending points of a line segment in the execution unit 200 even when the same command (the line segment generating command) is successively executed, since the command word is fetched for each set of the coordinates of the starting and the ending points of a line segment. Namely, in the conventional data processing system wherein commands and parameters have a structure as shown in FIG. 4, a command decoding operation is necessary for a timing interval before executing each data processing operation using a set of parameters in the execution unit 200, even when the same command is successively executed.

(5) Structure of Commands and Parameters in the Embodiment of Present Invention

Figure 7:
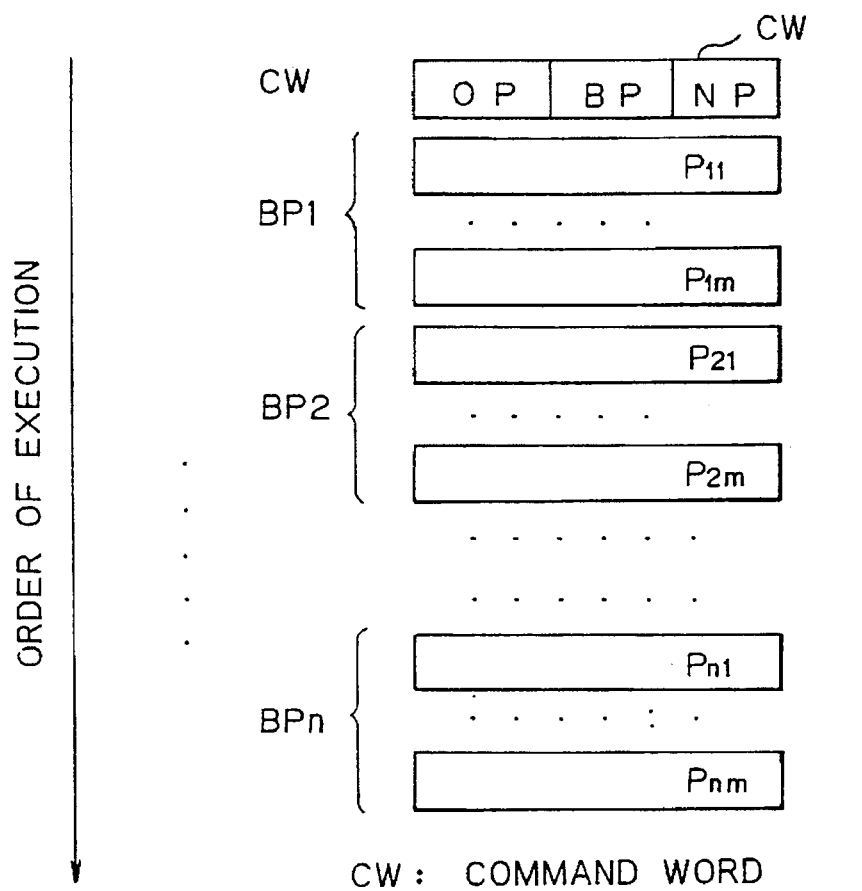
FIG. 7 shows an example of the structure of a command and a series of parameters accompanying the command.

FIG. 7 shows an example of the structure of a command and a series of parameters accompanying the command. The command and the parameters in FIG. 7 correspond to the series of the commands and the parameters in FIG. 4, i.e., the command and the parameters in FIG. 7 have the same information as the the series of the commands and the parameters in FIG. 4 when the contents in the command words C1, C2, ... Cn are the same in FIG. 4.

In FIG. 7, CW denotes a command word, BP1, BP2, ... BPn each denote a basic parameter set, OP denotes an operation code, and $P_{11}, \ldots P_{1m}, P_{21}, \ldots P_{2m}, \ldots P_{n1}, \ldots P_{nm}$ each denote a parameter word as in FIG. 4, where "n" is the number of the basic parameter sets, and "m" is the number of the parameter words in each basic parameter set. Generally, each command word CW is accompanied by zero to a plurality of basic parameter sets, and each command word CW contains an operation code OP which indicates what the command instructs, the number BP of the parameter words in each basic parameter set, and the number NP of the basic parameter sets. In the example of FIG. 7, BP=m and NP=n. A set of parameters which is contained in the m parameter words $P_{i1}, \ldots P_{im}$ (i=1–m) in each basic parameter set BPi, are used at the same time for executing one operation in the execution unit 200 in accordance with the command word OP.

FIG. 8 shows an example of the content of the command and parameter memory 502 corresponding to the above command and parameter structure of FIG. 7.

In the example of FIG. 8, a command set of a line segment generating command is shown. In the address 0000, a command word which indicates that the command is a line segment generating command, is stored. In the address 0001, the X and Y coordinates of starting point ($X_{s0}$, $Y_{s0}$) are stored, and in the address 0002, the X and Y coordinates of ending point ($X_{e0}$, $Y_{e0}$) are stored. In the following pairs of addresses (0011, 0100), (0101, 0111), . . . , similar sets of parameters, each pair containing a pair of the coordinates of a starting point and an ending point, are stored, thereby to draw line segments between different starting and ending point coordinates.

Figure 9:
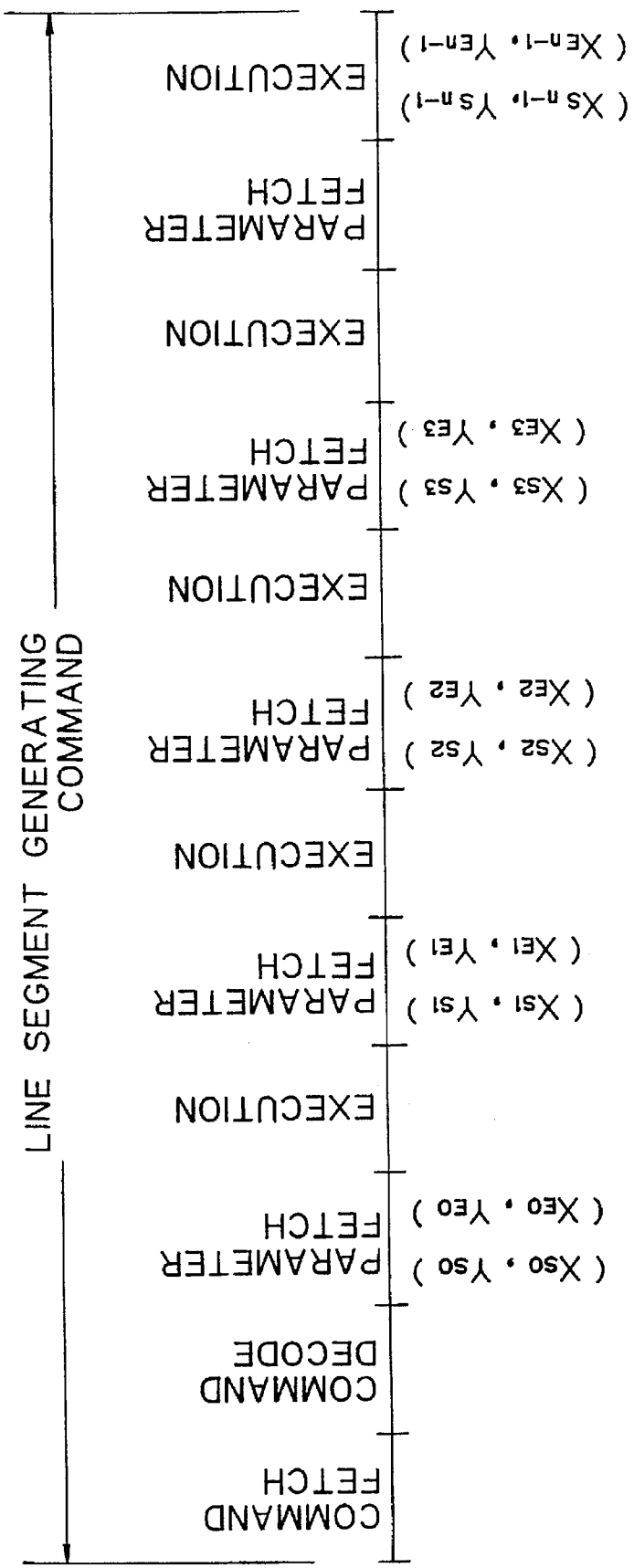
FIG. 9 shows a timing of executing data processing which is instructed by the series of commands and parameters as shown in FIG. 7.

FIG. 9 shows a timing of executing data processing which is instructed by the series of commands and parameters as shown in FIG. 7.

As shown in FIG. 9, in the data processing system wherein a command and related parameters supplied to the image processor 500 have a structure as shown in FIG. 8, a command decoding operation is necessary only once, just after the command word CW is input in the execution unit 200, i.e., the command decoding operation is not necessary for a timing interval before executing each data processing operation on a set of the coordinates of the starting and the ending points of a line segment in the execution unit 200 when the same operation (i.e., the line segment generating command) is repeatedly executed for different sets of parameters, since the command word is fetched at the top of the command set only.

Thus, when the same operation is repeatedly executed for different sets of parameters, the time necessary to fetch the total set of commands and parameters, and to decode the command are reduced by using the set of a command and parameters as shown in FIG. 7, and further, it reduces the necessary size of the command and parameter memory 502, and the time of occupying the system bus 505 for fetching the above set.

Figure 10:
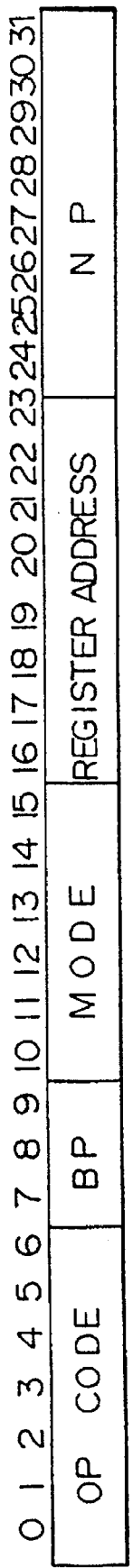
FIG. 10 shows the format of the command word CW in the embodiment of the present invention.

FIG. 10 shows the format of the command word CW in the embodiment of the present invention.

In FIG. 10, OP CODE denotes an operation code, BP denotes the above-mentioned number of the parameter words in each basic parameter set, and NP denotes the above-mentioned number of the basic parameter sets. The denotations MODE and REGISTERS ADDRESS are explained later.

(6) The Command Decoding Portion 50

Figure 11:
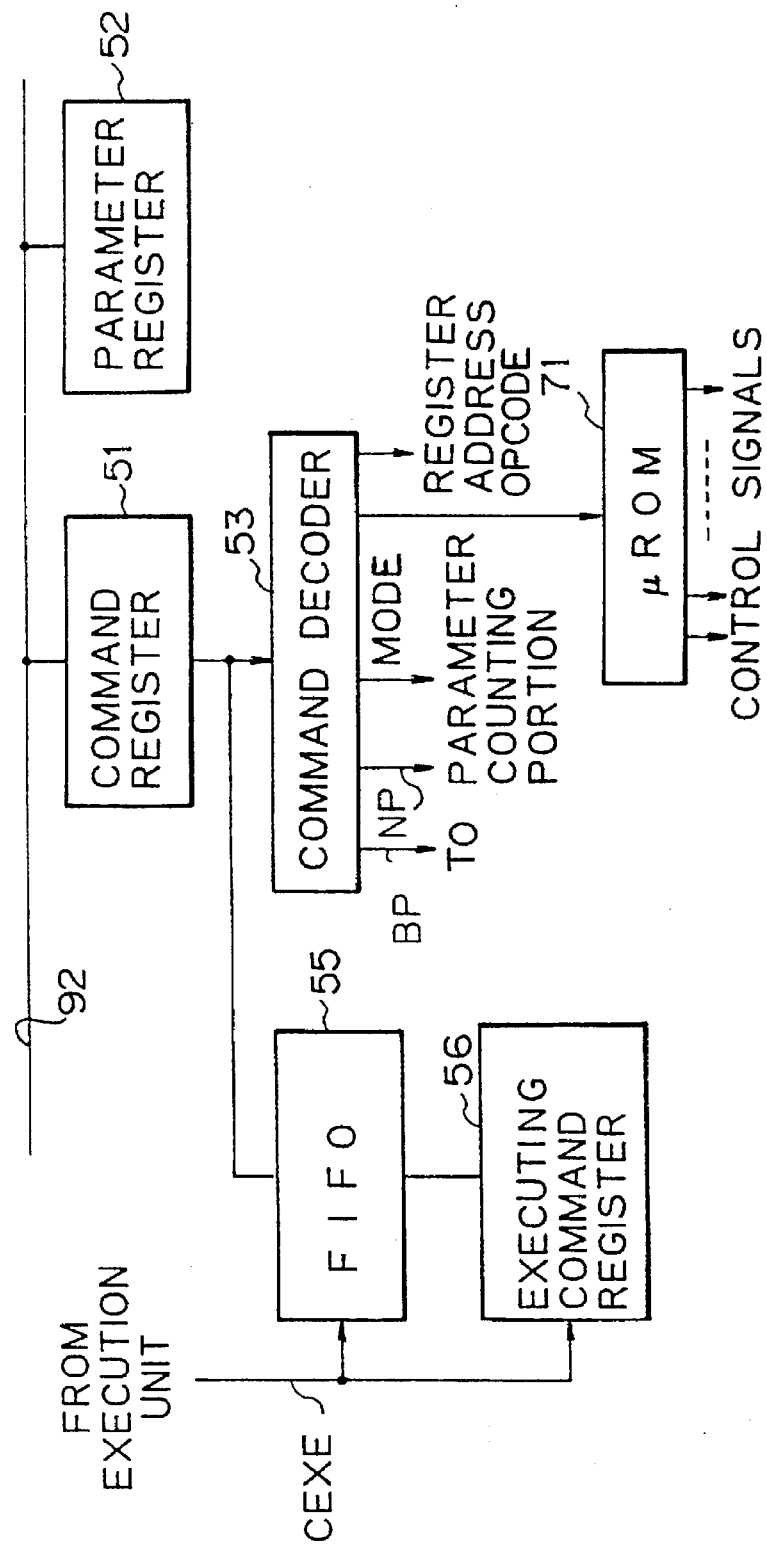
FIG. 11 shows the construction of the command decoding portion 50 in the image processor 500 of FIG. 3A.

FIG. 11 shows the construction of the command decoding portion 50 in the image processor 500 of FIG. 3A.

In FIG. 11, reference numeral 51 denotes a command register, 52 denotes a parameter register, 53 denotes a command decoder, 55 denotes a FIFO memory, and 56 denotes an executing command register. The micro ROM 71 shown in FIG. 11 is a main component of the command fetch control portion 70.

The command register 51 and the parameter register 52 are connected to the internal data bus 92. The above-mentioned command word CW shown in FIG. 10 is written in the command register 51 when the command word CW is prefetched. The output of the command register 51 is decoded in the command decoder 53. Among the output of the command decoder 53, the decoded result of the operation code OP CODE is applied to the input terminal of the micro ROM 71, and the decoded results of the numbers BP and NP, and the portion MODE are input into the parameter counting portion 60. The content of the REGISTER ADDRESS portion in the command word CW is applied to an address field register 521 which is explained later with reference to FIG. 24.

The output of the command register 51 is also input into the FIFO memory 55. The FIFO memory 55 and the executing command register 56 are provided to hold the command code when an exceptional condition occurs. As explained later, all the commands and the parameters (command sets) which have been prefetched are stored in the command and parameter buffer memory in the execution unit 200 until the data processing regarding the command or the parameters are executed in the the execution unit 200. The command codes stored in the command and parameter buffer memory in the execution unit 200 are at the same time held in the FIFO memory 55, and the command word, regarding which the data processing is executed in the execution unit 200, is held in the executing command register 56. To realize the above, a signal CEXE which is output from the execution unit 200 when the execution unit 200 inputs a new command to be executed, is applied to the FIFO memory 55 and the executing command register 56, for an output control of the FIFO memory 55 and for an input control of the executing command register 56, respectively. Regarding the exceptional condition processing, a further explanation is given later.

(7) The Address Calculation Circuit 40

Figure 12:
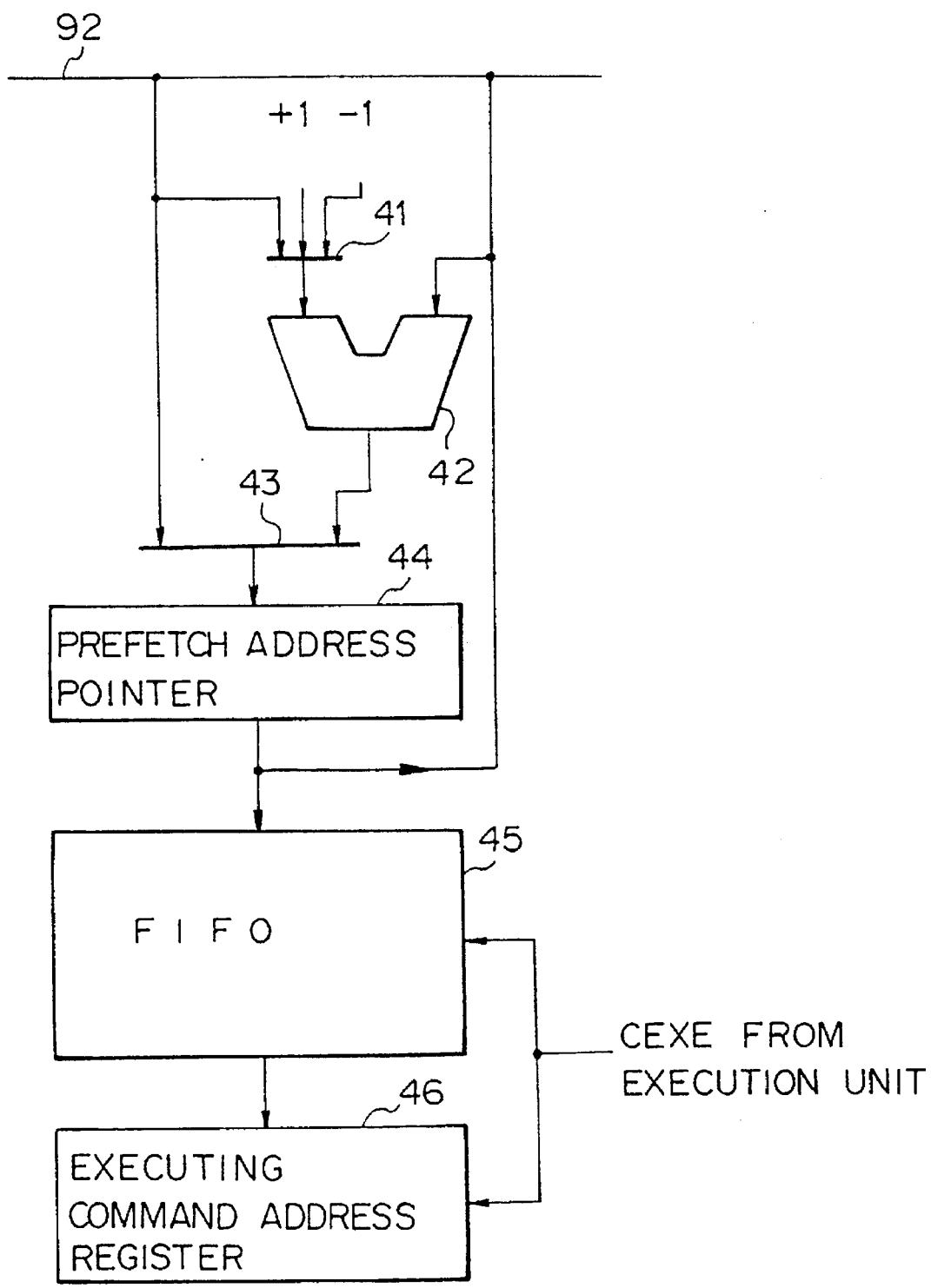
FIG. 12 shows the construction of the address calculation circuit 40 in the image processor 500 of FIG. 3A.

FIG. 12 shows the construction of the address calculation circuit 40 in the image processor 500 of FIG. 3A.

In FIG. 12, reference numerals 41 and 43 each denote a selector, 42 denotes an adder circuit, 44 denotes a prefetch address pointer, 45 denotes a FIFO memory, and 46 denotes an executing command address register.

The selector 41 receives the value from the internal data bus 92, a constant value +1, and a constant value −1, and selects one of the inputs as its output under the control of the micro ROM 71 (FIG. 11). The output of the selector 41 is applied to one of the input terminals of the adder 42. The prefetch address pointer 44 holds an address which is used for a prefetch operation. The output of the prefetch address pointer 44 is output to the internal data bus 92, and is applied to the other input terminal of the adder 42. The adder 42 adds the above two inputs. The selector 43 receives the value from the internal data bus 92 and the output of the adder 42, and outputs one of the inputs as its output under the control of the micro ROM 71. The output of the selector 42 is applied to the prefetch address pointer 44.

Normally, the selector 41 selects +1 and the selector 43 selects the output of the adder 42 as their outputs, respectively. When a command which is decoded in the command decoder 53 is a branch command which instructs to jump the address by a relative address value, the micro ROM 71 controls the selector 41 to select the input from the internal data bus 92, and the selector 43 to select the output of the adder 42. When a command which is decoded in the command decoder 53 is a branch command which instructs to jump the address to an absolute address, the micro ROM 71 controls the selector 43 to select the input from the internal data bus 92.

The (relative or absolute, or direct or indirect) address information contained in the branch command is once written in the command register 51 (FIG. 11) and/or the parameter register 52 (FIG. 11) when the branch command is prefetched. Although not shown, branch commands are constituted by a command word only, or a command word and a parameter word in this embodiment. When a branch command is constituted by a command word only, the command word is written in the command register 51; when a branch command is constituted by a command word and a parameter word, the command word is written in the command register 51, and the parameter word is written in the parameter register 52. When information on direct addressing is contained in the command, the address information in the command is supplied to the address calculation circuit 40 through the internal data bus 92; when information on indirect addressing is contained in the command, the relative or absolute address value is obtained by fetching the value from the memory or a register using the address information in the command, and the obtained address value is supplied through the internal data bus 92 to the address calculation circuit 40. Further, the characteristic feature of the present invention regarding the operation when a branch command is prefetched, is explained later.

The output of the prefetch address pointer 44 is also input into the FIFO memory 45. The FIFO memory 45 and the executing command register 46 are provided to hold the address of the command code when an exceptional condition occurs. As mentioned before, all the commands and the parameters (command sets) which have been prefetched are stored in the command and parameter buffer memory in the execution unit 200 until the data processing regarding the command or the parameters are executed in the the execution unit 200. The address of the command codes, which codes are stored in the command and parameter buffer memory in the execution unit 200, are at the same time held in the FIFO memory 45, and the address of the command word regarding which the data processing is executed in the execution unit 200, is held in the executing command register 46. To realize the above, a signal CEXE which is output from the execution unit 200 when the execution unit 200 inputs a new command to be executed, is applied to the FIFO memory 45 and the executing command register 46, for an output control of the FIFO memory 45 and for an input control of the executing command register respectively. Regarding the exceptional condition processing, a further explanation is given later.

(8) The Operation When a Branch Command is Prefetched

As explained before, in the prior art, the prefetch is carried out simply in the order of successive addresses in the memory (the command and parameter memory 502) in which the data (commands and parameters) to be processed is stored since, generally, the data to be processed is stored in the order of the processing (as shown in FIGS. 5 and 8). In the prior art, when the branch command is processed in the data processing device, in most cases the command which is to be processed, in the next step, is not the command which is stored in the address following the branch command in the above memory, and therefore, is not the command which has been prefetched following the branch command and is stored in the command and parameter buffer memory. Namely, when a branch command is detected as an output of the command decoder 53, the prefetched data following the branch command is, in most cases, useless. This means that useless prefetch operations and the related useless bus arbitrations are carried out in the conventional data processing device, and these useless bus arbitrations lower the efficiency of the system.

The branch commands include: simple jump commands (containing information on an absolute address or a relative address); conditional jump commands; subroutine jumps (containing information on an absolute address or a relative address); and return subroutine jump commands, and the like. Generally, where to jump by a branch command is unknown until the execution of the branch command is completed in the execution unit 200.

According to the present invention, the micro ROM 71 temporarily stops the prefetch operation for the commands following the branch command when a branch command is detected as an output of the command decoder 53. The temporary stop continues until the execution of the branch command is completed in the execution unit 200.

Figure 13:
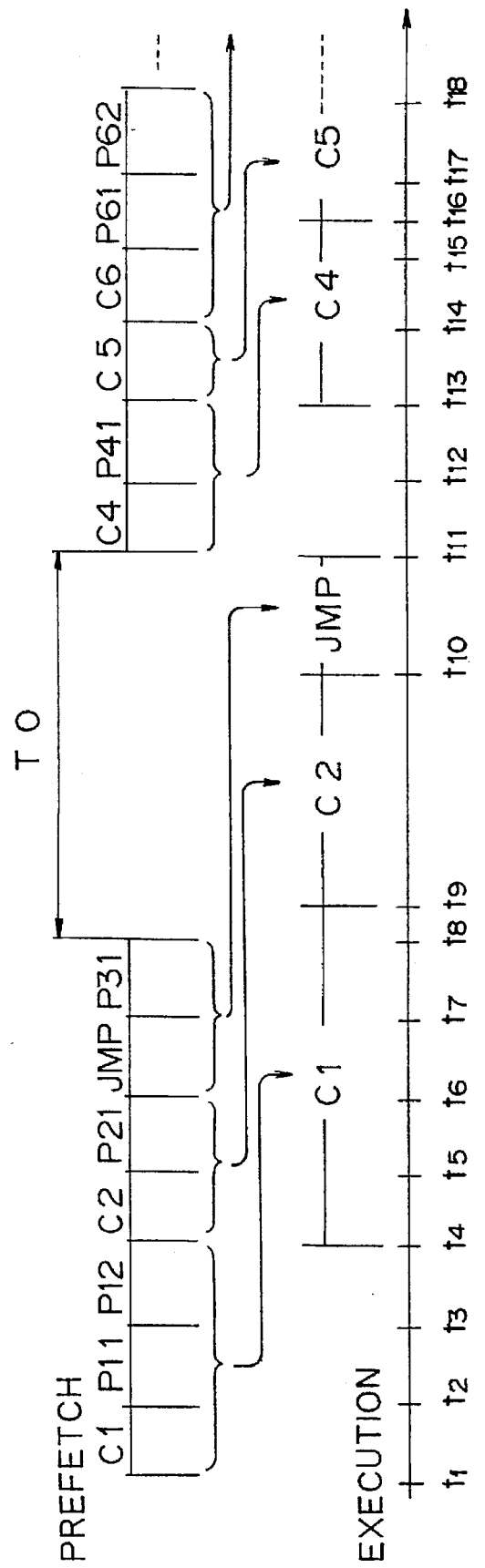
FIG. 13 shows an example of the timing of the operation in the embodiment when a branch command is prefetched.

An example of the timing of the operation, in the condition when a branch command is prefetched, is shown in FIG. 13. At the time t7, a jump command word JMP is prefetched and decoded. From the decoded result, it is known that a parameter word P31, which contains the aforementioned address information, follows the jump command word JMP, in this example. Accordingly, the micro ROM 71 controls prefetching of the next one word which is stored in the address next to the address wherein the jump command word JMP is stored in the command and parameter memory 502. Then, at the time t8, the micro ROM 71 stops the prefetch operation for the commands following the branch command until the execution of the branch command is completed in the execution unit 200. At the time t11, the execution of the branch command is completed in the execution unit 200. As the result of the execution of the branch command, information on the address for the next prefetch operation is given to the address calculation circuit 40 through the internal data bus 92, and the micro ROM 71 starts the following prefetch operation.

Thus, according to the present invention, useless prefetch operations and the useless bus arbitrations are minimized, and therefore, the efficiency of the system is improved.

(9) The Parameter Counting Portion 60

Figure 14:
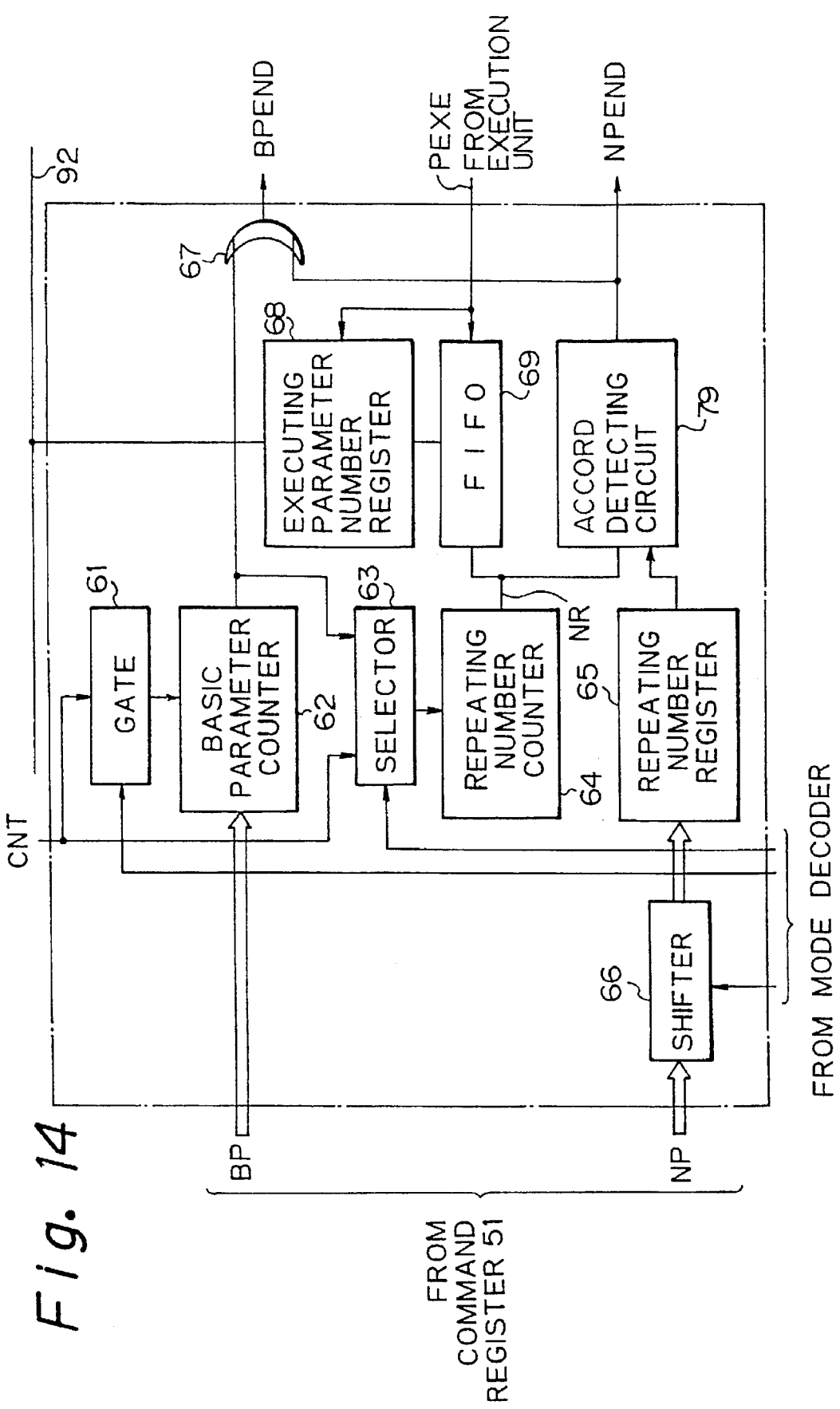
FIG. 14 shows the construction of the parameter counting portion 60 in the image processor 500 of FIG. 3A.

FIG. 14 shows the construction of the parameter counting portion 60 in the image processor 500 of FIG. 3A.

In FIG. 14, reference numeral 61 denotes a gate circuit, 62 denotes a basic parameter counter, 63 denotes a selector, 64 denotes a repeating number counter, 65 denotes a repeating number register, 66 denotes a shifter, 67 denotes an OR circuit, 68 denotes a executing parameter number register, 69 denotes a FIFO memory, and 79 denotes an accord detecting circuit. CNT denotes a count signal which is output every time when one parameter word is prefetched from the command and parameter memory 502, and is generated by the micro ROM 71.

The gate 61 is provided, in the path of the count signal CNT to the basic parameter counter 62, as a count down signal. The selector 63 receives the count signal CNT and the output of the basic parameter counter 62, and selects one of these inputs as its output to the repeating number counter 64 as a count up signal. The shifter 66 is provided in the path of the aforementioned number NP of the basic parameter sets in a command set, which is supplied from the aforementioned command decoder 53.

When a new command word is prefetched and decoded in the command decoding portion 50, the aforementioned number BP of the parameter words in each basic parameter set, which is supplied from the aforementioned command decoder 53, is loaded in the basic parameter counter 62 as a preset value, and the above number NP is loaded in the repeating number register 65 through the shifter 66 as a preset value. The gate circuit 61, the selector 63, and the shifter 66 are controlled by the aforementioned portion MODE in the content of the command word as shown in FIG. 10.

When the command set has a structure as shown in FIG. 7, the gate 61 is open, the selector 63 selects the output of the basic parameter counter 62 as its output, and the shifter does not shift the above number NP.

The count of the basic parameter counter 62 indicates the number of parameter words which have not yet been prefetched, in each basic parameter set. When all the parameter words in each basic parameter set have been prefetched, the basic parameter counter 62 outputs an active parameter zero signal. The parameter zero signal also become active when a command word which is not followed by a parameter word, is prefetched, as the BP portion in the command word indicates zero.

The count of the repeating number counter 64 indicates the number of basic parameter sets which have been already prefetched in each command set. The accord detecting circuit 79 compares the count of the repeated number counter 64 and the output of the repeated number register 65. When all the basic parameter sets in each command set have been prefetched, the accord detecting circuit 79 outputs a command set prefetch complete signal NPEND. The logical sum of the output of the basic parameter counter 62, and the output of the accord detecting circuit 79 is obtained in the OR circuit 67, and is output as a signal BPEND to the micro ROM 71 in the command fetch control portion 70 and to the execution unit interface 80. Thus, the BPEND signal becomes active every time a basic parameter set is prefetched (a prefetch of a basic parameter set is completed), or when a command word which is not followed by a parameter word, is prefetched.

The output of the repeating number counter 64 is also input into the FIFO memory 69. The FIFO memory 69 and the executing parameter number register 68 are provided to hold the number of basic parameter sets which have been already prefetched in each command set when an exceptional condition occurs. As mentioned before, all the commands and the parameters (command sets) which have been prefetched are stored in the command and parameter buffer memory in the execution unit 200 until the data processing regarding the command or the parameters are executed in the the execution unit 200. The number of the basic parameter sets which are stored in the command and parameter buffer memory in the execution unit 200 are at the same time held in the FIFO memory 69, and the number of the basic parameter set, regarding which the data processing is executed in the execution unit 200, is held in the executing parameter number register 68. To realize the above, a signal PEXE, which is output from the execution unit 200 when the execution unit 200 inputs a new basic parameter set to be executed, is applied to the FIFO memory 69 and the executing parameter number register 68 for an output control of the FIFO memory 69 and for an input control of the executing command register 68, respectively. Regarding the exception processing, a further explanation is given later.

Further, the operation of the parameter counting portion 60 when a command set has a different structure from the structure shown in FIG. 7, will be explained later.

(10) The Execution Unit Interface 80 and the Data Buffer in the Execution Unit 200

FIGS. 15A and 15B show the constructions of the execution unit interface 80 in the image processor 500, the command and parameter buffer memory for storing the prefetched command sets, and the data amount monitoring circuit provided in the execution unit 200.

In FIGS. 15A and 15B, the construction encircled by a dashed line 80 is the execution unit interface 80 of FIG. 3A, and the construction encircled by a dashed line 210 is the command and parameter buffer memory for storing the prefetched command sets. Reference numeral 220 denotes an executing command set holding portion wherein a command set, regarding which the execution unit 200 is being carried out data processing, is held, 230 denotes a data amount monitoring circuit which cooperates with the execution unit interface 80, and 224 denotes an execution portion which executes data processing using the basic parameter set held in the executing command set holding portion 220 in accordance with a command held in the executing command set holding portion 220.

The command and parameter buffer memory 210 comprises a command FIFO memory 211 for storing prefetched command words, and a parameter FIFO memory 212 for storing prefetched basic parameter sets.

The executing command set holding portion 220 comprises an executing command register 221 for holding a command word in execution, an executing command decoder 222 for decoding the content of the executing command register 221, and an executing basic parameter set register 223 for holding a basic parameter set in execution.

The data amount monitoring circuit 230 monitors the amount of the prefetched command words stored in the command FIFO memory 211, and the amount of the prefetched basic parameter sets stored in the parameter FIFO memory 212, and outputs a prefetch allowance signal WRRDY, which is supplied to the micro ROM 71 in the command fetch control portion 70.

The execution unit interface 80 generates write control signals for the command and parameter buffer memory 210, and outputs information on the prefetch of the command words and parameter words, respectively, to the data amount monitoring circuit 230.

The execution unit interface 80 comprises AND circuits 81, 83, 85. 86, and 87, an inverter 82, and a C/P flag register 84.

The C/P flag register 84 indicates whether a word prefetched at the time is a command word or a parameter word, and is implemented by a flip-flop circuit. The C/P flag register 84 receives a CSET signal and a reset signal RESET from the micro ROM 71, the latter at its reset terminal, and a PSET signal from the micro ROM 71 at its set terminal. The $\bar{Q}$ output C/P of the C/P flag register 84, which is "1" when the C/P flag register 84 is in the set state, or "0" when the C/P flag register 84 is in the reset state, is applied directly to one input terminal of the AND circuit 81, is applied through the inverter 82 to one input terminal of the AND circuit 83, and is further applied to the micro ROM 71 in the command fetch control portion 70. The aforementioned write timing signal WR, which is output from the access control circuit 10 for holding a prefetched word in the image processor 500, is applied to the other input terminals of both the AND circuits 81 and 83. Thus, the AND circuit 81 outputs an active signal when a command word is prefetched, and the AND circuit 83 outputs an active signal when a parameter word is prefetched.

The output of the AND circuit 81 is applied to the command register 51 as an input (write) control signal, and the output of the AND circuit 83 is applied to the parameter register 52 as an input (write) control signal.

The output of the AND circuit 81 is also applied to one input terminal of the AND circuit 85, and the output of the AND circuit 83 is also applied to one input terminal of the AND circuit 86. A part of the output of the command decoder 53 in the command decoding portion 50, which indicates whether or not the prefetched command code is a command which is to be executed in the execution unit 200, is applied to the other input terminal of each of the AND circuits 85 and 86. Thus, the AND circuit 85 outputs active signal CMWR when a command word which is to be executed in the execution unit 200, is prefetched, and the AND circuit 86 outputs an active signal PRWR when a parameter word which is to be executed in the execution unit 200, is prefetched.

The above output CMWR of the AND circuit 85 is applied to the command FIFO memory 211 as an input control signal, and the above output PRWR of the AND circuit 86 is applied to the parameter FIFO memory 212 as an input control signal. The command FIFO memory 211 inputs a command word which is transferred from the command and parameter memory 502 through the internal data bus 92 when an active CMWR signal is applied thereto, and the parameter FIFO memory 212 inputs a parameter word which is transferred from the command and parameter memory 502 through the internal data bus 92 when an active PRWR signal is applied thereto.

The above part of the output of the command decoder 53 in the command decoding portion 50, which indicates whether or not the prefetched command code is a command which is to be executed in the execution unit 200, is also applied to one input terminal of the AND circuit 87. The aforementioned BPEND signal from the parameter counting portion 60 is applied to the other input terminal of the AND circuit 87. As the BPEND signal becomes active every time a basic parameter set is prefetched (a prefetch of a basic parameter set is completed), or when a command word which is not followed by a parameter word, is prefetched. Thus, the AND circuit 87 outputs an active signal every time a basic parameter set which is to be executed in the execution unit 200, is prefetched (a prefetch of a basic parameter set is completed), or when a command word which is to be executed in the execution unit 200, and is not followed by a parameter word, is prefetched.

The above output of the AND circuit 87 is supplied to the data amount monitoring circuit 230. The data amount monitoring circuit 230 comprises up-down counters 231, 233, and 235, a parameter vacancy detecting circuit 232, a command vacancy detecting circuit 234, a last operation amount detecting circuit 236, an OR circuit 237, and an RS-flip-flop circuit 238.

The up-down counter 231 receives the above PRWR signal from the AND circuit 86 in its UP input terminal, and a PEXE signal from the execution portion 224 in its DOWN input terminal. The execution portion 224 controls the parameter FIFO memory 212 and the executing basic parameter set register 223 to fetch a new basic parameter set from the parameter FIFO memory 212 into the executing basic parameter set register 223, and outputs an active PEXE signal every time the fetch of a parameter word from the parameter FIFO memory 212 into the executing basic parameter set register 223 is carried out. Thus, the count PVC of the up-down counter 231 indicates the number of the parameter words which are stored in the parameter FIFO memory 212.

Similarly, the up-down counter 233 receives the above CMWR signal from the AND circuit 85 in its UP input terminal, and a CEXE signal from the execution portion 224 in its DOWN input terminal. The execution portion 224 controls the command FIFO memory 211 and the executing command register 221 to fetch a new command from the command FIFO memory 211 into the executing command register 221, and outputs an active CEXE signal every time the fetch of a command word from the command FIFO memory 211 into the executing command register 221 is carried out. Thus, the count CVC of the up-down counter 233 indicates the number of the command words which are stored in the command FIFO memory 211.

Further, the up-down counter 235 receives the output of the AND circuit 87 in its UP input terminal, and an EAEXE signal from the execution portion 224 in its DOWN input terminal. The execution portion 224 outputs an active EAEXE signal every time a basic parameter set is fetched from the command and parameter buffer memory 210 into the executing command set holding portion 220 (a fetch of a basic parameter set is completed), or when a command word which is not followed by a parameter word, is fetched from the command and parameter buffer memory 210 into the executing command set holding portion 220. The fetch of a basic parameter set from the command and parameter buffer memory 210 into the executing command set holding portion 220, is carried out for each operation of data processing in the execution portion 224. Thus, the count EAC of the up-down counter 235 indicates the amount of the command data which are stored in the command and parameter buffer memory 210, by the number of operations which is necessary to complete the execution of the content of the command and parameter buffer memory 210.

The above count of the up-down counter 231 is input into the parameter vacancy detecting circuit 232, and the parameter vacancy detecting circuit 232 outputs an active signal when the count is more than a first predetermined number. The first predetermined number is determined as the following difference, (the maximum number of parameter words which can be stored in the the parameter FIFO memory 212)–(the possible maximum number of parameter words of a basic parameter set).

Similarly, the above count of the up-down counter 233 is input into the command vacancy detecting circuit 234, and the command vacancy detecting circuit 234 outputs an active signal when the count is more than a second predetermined number. The second predetermined number is determined as the following difference, (the maximum number of commands which can be stored in the the command FIFO memory 211)–(one).

The output of the parameter vacancy detecting circuit 232 and the output of the command vacancy detecting circuit 234 are input into the OR circuit 237. The output VC of the OR circuit 237 is applied to a reset terminal R of the RS-flip-flop circuit 238.

The above count of the up-down counter 235 is input into the last operation amount detecting circuit 236, and the last operation amount detecting circuit 236 outputs an active signal when the count is less than a third predetermined number. The third predetermined number is, for example, one or two.

The output of the last execution amount detecting circuit 236 is applied to a set terminal S of the RS-flip-flop circuit 238. The Q output of the RS-flip-flop circuit 238 is the aforementioned prefetch allowance signal WRRDY, which is supplied to the micro ROM 71. Thus, the prefetch allowance signal WRRDY becomes active when the count EAC becomes less than the above third predetermined number, and becomes inactive either when the count PVC exceeds the above first predetermined number, or when the count CVC exceeds the above second predetermined number.

Receiving the prefetch allowance signal WRRDY, the micro ROM 71 controls the prefetch unit to start a series of prefetch operations when the prefetch allowance signal WRRDY changes "0" to "1", and to continue the prefetch operation until the prefetch allowance signal WRRDY returns to "0".

As a variation of the construction of FIGS. 15A and 15B, the command FIFO memory 211 may be replaced by a register, and the parameter FIFO memory 212 may be replaced by a shift register having stages of a number equal to the number of the parameter words in a basic parameter set wherein only one command word and only one basic parameter set are held in the command and parameter buffer memory 210. In the above variation, the up-down counters 231 and 233 are each replaced by a flag register which indicates whether or not a corresponding register in the command and parameter buffer memory 210 is vacant, and the up-down counter 235 is unnecessary.

(11) Other Constructions of the Execution Unit Interface 80 and the Command and Parameter Buffer Memory in the Execution Unit 200

Figure 16:
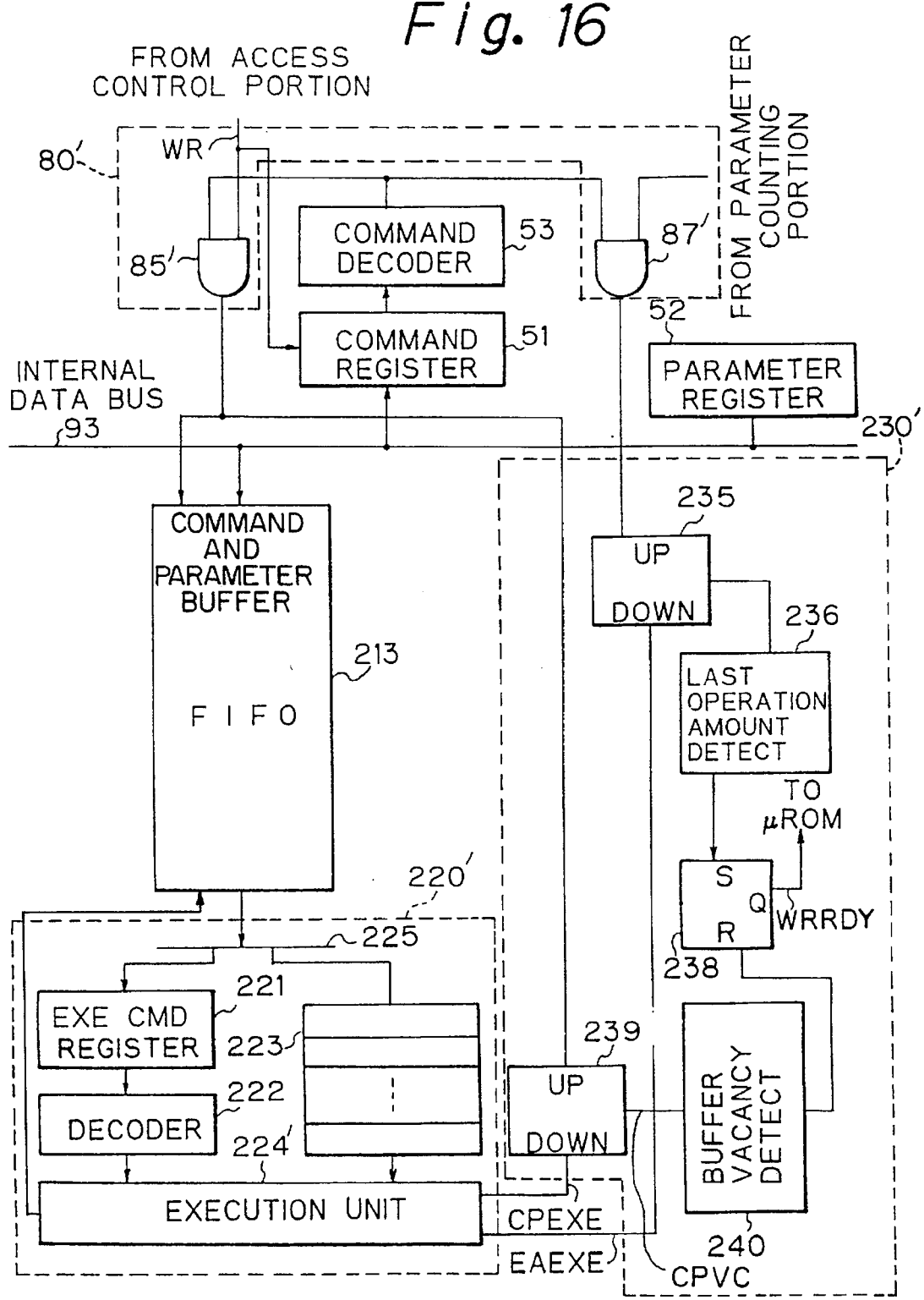

FIG. 16 shows other constructions of the execution unit interface 80 in the image processor 500, the command and parameter buffer memory for storing the prefetched command sets, and the data amount monitoring circuit provided in the execution unit 200.

In FIG. 16, the construction encircled by a dashed line 80' corresponds to the execution unit interface 80 of FIG. 3A, and the construction encircled by a solid line 213 corresponds to the command and parameter buffer memory for storing the prefetched command sets. Reference numeral 220' denotes an executing command set holding portion wherein a command set regarding which the execution unit 200 is carrying out data processing, is held, 230' denotes a data amount monitoring circuit which cooperates with the execution unit interface 80, and 224' denotes an execution portion which executes data processing using the basic parameter set held in the executing command set holding portion 220 in accordance with a command held in the executing command set holding portion 220.

The command and parameter buffer memory 213 is constituted by a FIFO memory 211 for storing prefetched command words and prefetched basic parameter sets.

The executing command set holding portion 220' comprises an executing command register 221 for holding a command word in execution, an executing command decoder 222 for decoding the content of the executing command register 221, an executing basic parameter set register 223 for holding a basic parameter set in execution, and a selector 225.

The data amount monitoring circuit 230' monitors the amount of the prefetched data (command words and parameter words) stored in the FIFO memory 213, and outputs a prefetch allowance signal WRRDY, which is supplied to the micro ROM 71 in the command fetch control portion 70.

The execution unit interface 80' generates a write control signal for the command and parameter buffer memory 213, and outputs information on the prefetch of the command or parameter words to the data amount monitoring circuit 230'.

The execution unit interface 80' comprises AND circuits 85' and 87'.

The aforementioned write timing signal WR, which is output from the access control circuit 10 for holding a prefetched word in the image processor 500, is applied to one input terminal of the AND circuit 85'. A part of the output of the command decoder 53 in the command decoding portion 50, which indicates whether or not the prefetched command code is a command which is to be executed in the execution unit 200, is applied to the other input terminal of each of the AND circuits 85'. Thus, the AND circuit 85' outputs an active signal when a command word, or a parameter word which is to be used for the execution of data processing in the execution unit 200, is prefetched.

The above output of the AND circuit 85' is applied to the FIFO memory 213 as an input control signal, and the above output PRWR of the AND circuit 86 is applied to the parameter FIFO memory 213 as an input control signal. The FIFO memory 213 inputs a command or parameter word which is transferred from the command and parameter memory 502 through the internal data bus 92 when an active input control signal is applied thereto.

The AND circuit 87' functions the same as the AND circuit 87 in FIG. 15A. Namely, the AND circuit 87' outputs an active signal every time a basic parameter set which is to be executed in the execution unit 200, is prefetched (a prefetch of a basic parameter set is completed), or when a command word which is to be executed in the execution unit 200, and is not followed by a parameter word, is prefetched.

The above output of the AND circuit 87' is supplied to the data amount monitoring circuit 230'. The data amount monitoring circuit 230' comprises up-down counters 235 and 239, a buffer vacancy detecting circuit 240, a last operation amount detecting circuit 236, and an RS-flip-flop circuit 238.

The up-down counter 239 receives the above output of the AND circuit 85' in its UP input terminal, and a CPEXE signal from the execution portion 224' in its DOWN input terminal. At the beginning of an execution of data processing for a command set, or when an execution of data processing for a command set is completed, the execution portion 224' controls the FIFO memory 213, the selector 225, and the executing command register 221 to fetch a new command word from the parameter FIFO memory 212 into the executing command register 221. Or after a command word is fetched into the executing command register 221 and it is known that one or more parameter words follow the command word from the output of the command decoder 222, the execution portion 224' controls the FIFO memory 213, the selector 225, and the executing basic parameter set register 223 to fetch a new basic parameter set from the FIFO memory 212 into the executing basic parameter set register 223. The execution portion 224' outputs an active CPEXE signal every time the fetch of a word from the FIFO memory 213 into the executing basic parameter set register 223 is carried out. Thus, the count CPVC of the up-down counter 239 indicates the number of the command or parameter words which are stored in the FIFO memory 213.

Further, the up-down counter 235 receives the output of the AND circuit 87' in its UP input terminal, and an EAEXE signal from the execution portion 224' in its DOWN input terminal. The execution portion 224' outputs an active EAEXE signal every time a basic parameter set is fetched from the command and parameter buffer memory 213 into the executing command set holding portion 220' (a fetch of a basic parameter set is completed), or when a command word which is not followed by a parameter word, is fetched from the command and parameter buffer memory 213 into the executing command set holding portion 220'. The fetch of a basic parameter set from the command and parameter buffer memory 213 into the executing command set holding portion 220', is carried out for each operation of data processing in the execution portion 224'. Thus, the count EAC of the up-down counter 235 indicates the amount of the command and parameter words which are stored in the command and parameter buffer memory 213, by the number of operations which is necessary to complete the execution of the content of the command and parameter buffer memory 213.

The above count CPVC of the up-down counter 239 is input into the buffer vacancy detecting circuit 240, and the buffer vacancy detecting circuit 240 outputs an active signal when the count is more than a predetermined number. The predetermined number is determined as the following difference, (the maximum number of command and parameter words which can be stored in the the FIFO memory 213)–(the possible maximum number of parameter words of a basic parameter set).

The output of the buffer vacancy detecting circuit 240 is applied to a reset terminal R of the RS-flip-flop circuit 238.

The above count of the up-down counter 235 is input into the last operation amount detecting circuit 236, and the last operation amount detecting circuit 236 outputs an active signal when the count is less than a third predetermined number. The third predetermined number is, for example, one or two.

The output of the last execution amount detecting circuit 236 is applied to a set terminal S of the RS-flip-flop circuit 238. The Q output of the RS-flip-flop circuit 238 is the aforementioned prefetch allowance signal WRRDY, which is supplied to the micro ROM 71. Thus, the prefetch allowance signal WRRDY is active ("1") when the number of vacant word spaces in the FIFO memory 213 is larger than the possible maximum number of words of a basic parameter set, and an amount of data (command and/or parameter) corresponding to at least the above fifth predetermined number is stored in the command and parameter buffer memory 213.

Receiving the prefetch allowance signal WRRDY, the micro ROM 71 controls the prefetch unit to start a series of prefetch operations when the prefetch allowance signal WRRDY changes "1" to "0", and continues the prefetch operation until the prefetch allowance signal WRRDY returns to "0".

(12) Control Operation in the Embodiment I

Figure 17A:
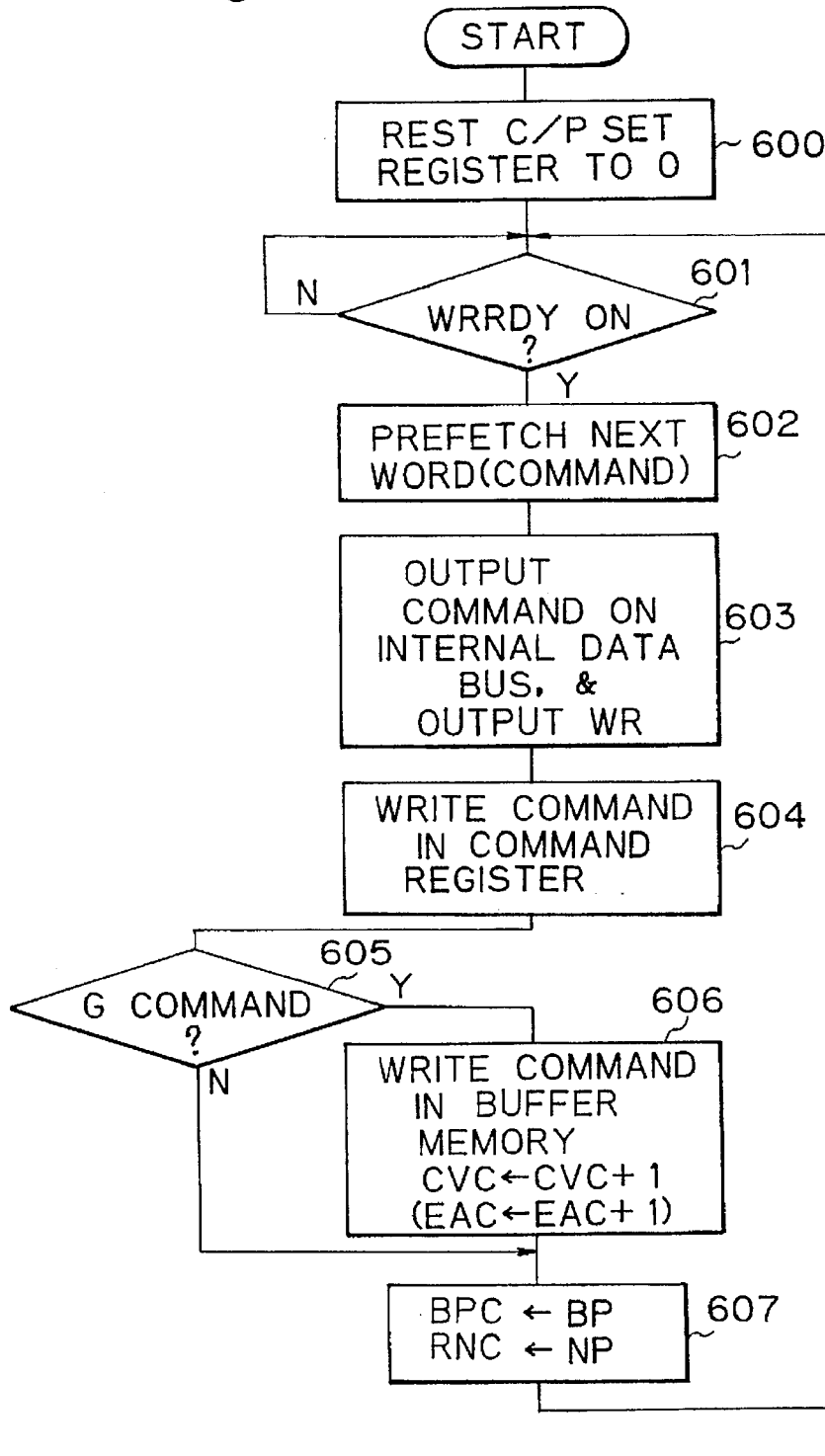
Figure 17B:
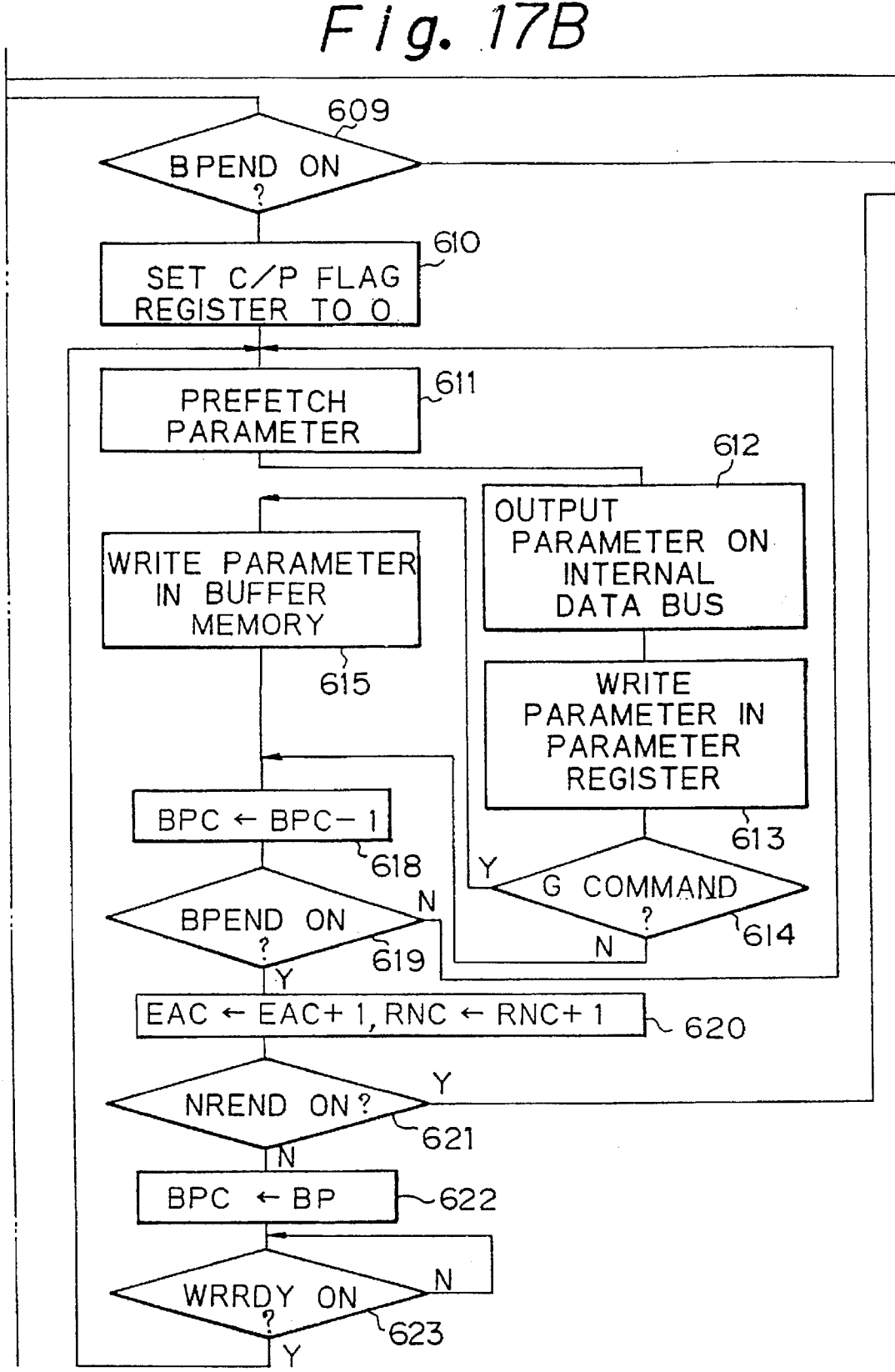
Figure 17C:
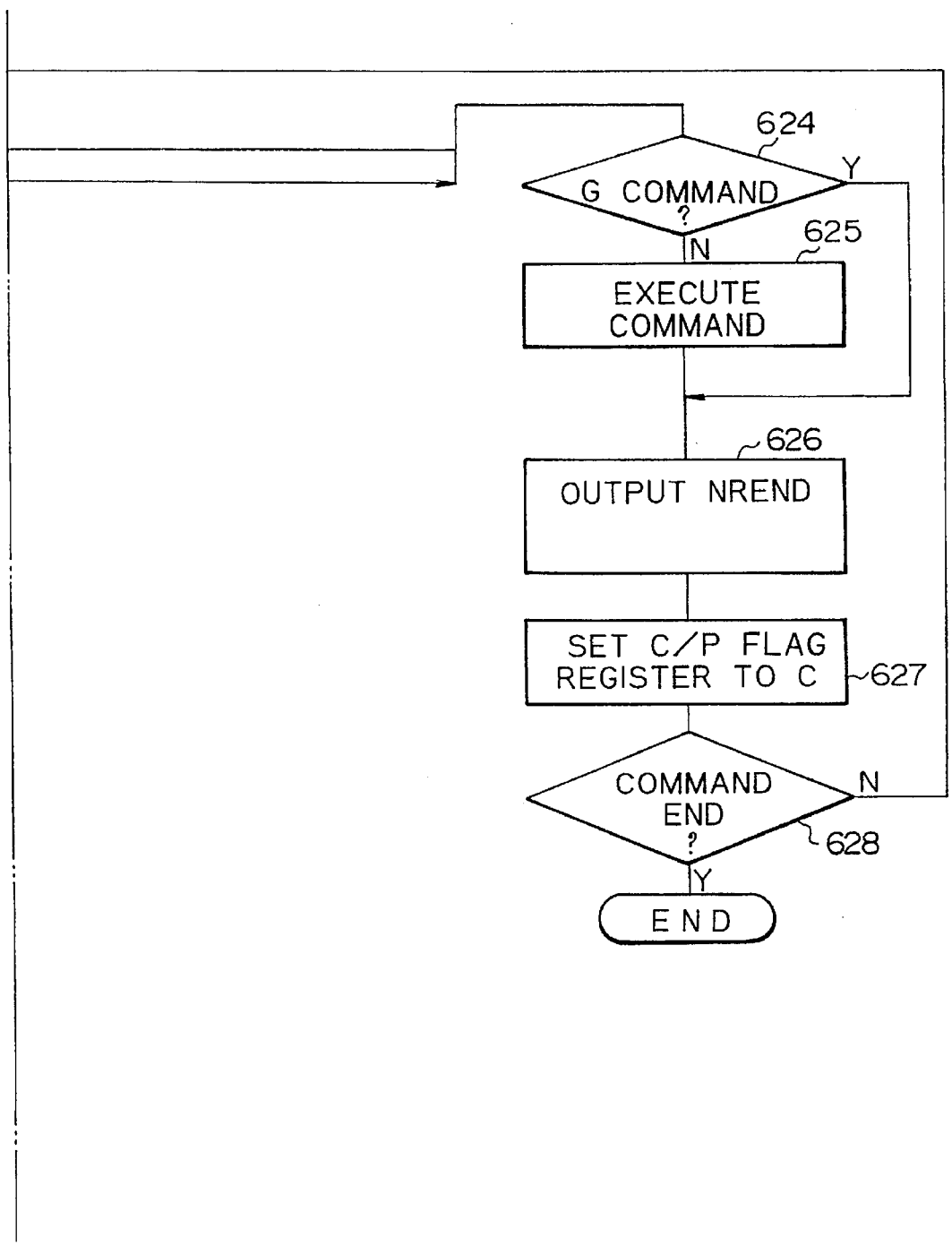

FIGS. 17A, 17B, and 17C show the control operation by the micro ROM 71 in the embodiment of the present invention. The operation of FIGS. 17A, 17B, and 17C is written based, on the construction of the execution unit interface 80 shown in FIG. 15A, but the operation of the construction of FIGS. 17A, 17B, and 17C is applicable to the construction of FIG. 16 when some portions are changed as explained below.

Initially, in the step 600, the C/P flag register 84 is reset so that its $\overline{Q}$ output C/P becomes "1", by the micro ROM 71.

In the step 601, it is determined whether or not the prefetch allowance signal WRRDY is ON ("1"). When YES is determined, a prefetch operation of a next (command) word in the command and parameter memory 502, is commenced. In the step 603, when the command word is output (transferred) on the internal data bus 92, the access control circuit 10 outputs the aforementioned write control signal WR. Accordingly, the transferred command word is written in the command register 51 in the step 604. In the step 605, it is determined whether or not the command is a command which is to be executed in the execution unit 200. When it is determined YES in the step 605, the command word is written in the command and parameter buffer memory 210 in the execution unit 200, and the count CVC of the up-down counter 233 is incremented by one by the output CWWR of the AND circuit 85, in the step 606. When the command word is not followed by a parameter word, the count EAC of the up-down counter 235 is further incremented by one by the output of the AND circuit 87. When it is determined NO in the step 605, the step 606 is skipped. Then, in the step 607, the number BP of the parameter words in each basic parameter set, and the number NP of the basic parameter sets, which are contained in the command word and are supplied through the command decoder 53, are loaded as their preset count values in the basic parameter counter 62 and the repeated number counter 64, respectively.

In the step 609, it is determined whether or not the the output BPEND of the parameter counting portion 60 is "1". When it is determined NO, the C/P flag register 84 is set to make the $\overline{Q}$ output C/P "0" by the micro ROM 71, in the step 610. In the step 611, a prefetch operation of a parameter word, following the previously prefetched word in the command and parameter memory 502, is commenced. In the step 612, the parameter word is output (transferred) on the internal data bus 92. The parameter word on the internal data bus 92 is written in the parameter register 52, in the step 613. In the step 614, it is determined whether or not the parameter is a parameter which accompanies a command which is to be executed in the execution unit 200. When it is determined YES in the step 614, the parameter word is written in the command and parameter buffer memory 210 in the execution unit 200, and the count PVC of the up-down counter 231 is incremented by one by the output PRWR of the AND circuit 86, in the step 618. In the construction of FIG. 16, the count CPVC of the up-down counter 239 is incremented by one by the output of the AND circuit 85'. When it is determined NO in the step 614, the step 615 is skipped. Then, in the step 618, the count of the basic parameter counter 62 is decremented by one in the step 618. When it is determined YES in the step 609, the operation goes to the step 624.

In the step 619, it is determined whether or not the output BPEND of the parameter counting portion 60 is ON ("1"). When it is determined NO, the operation goes to the step 611, and the next parameter word in the same basic parameter set is prefetched. When it is determined YES in the step 619, the count of the repeating number counter 64 is incremented in the step 620. In the step 621, it is determined whether or not the other output NREND of the parameter counting portion 60 is ON ("1"). When it is determined NO, the BP portion in the output of the command decoder 53 is loaded in the basic parameter counter 62 in the step 622. When it is determined YES in the step 621, the operation goes to the step 624. In the step 623, it is determined whether or not the prefetch allowance signal WRRDY is ON ("1"). When it is determined YES, the operation goes to the step 611, and the next basic parameter set is prefetched. When it is determined NO in the step 623, the prefetch operation is stopped until the prefetch allowance signal WRRDY becomes "1", according to the aforementioned characteristic feature of the present invention.

In the step 624, it is determined whether or not the parameter is a parameter which accompanies a command which is to be executed in the execution unit 200. When it is determined No, e.g., the command is a branch command, the command is executed in the step 625. When it is determined YES, the operation goes to the step 626. In the step 627, the C/P flag register 84 is reset so that its $\overline{Q}$ output C/P becomes "1" by the micro ROM 71. In the step 628, it is determined whether or not the prefetch of a series of command sets is ended. The last word of each series of command sets contains a signal which indicates it is the end of the command set, and the micro ROM 71 carries out the above determination based on the signal.NO, the operation goes to the step 601, and the prefetch operation of the next command set is carried out. When it is determined YES, the operation ends.

(13) Control Operation in the Embodiment II

Figure 18:
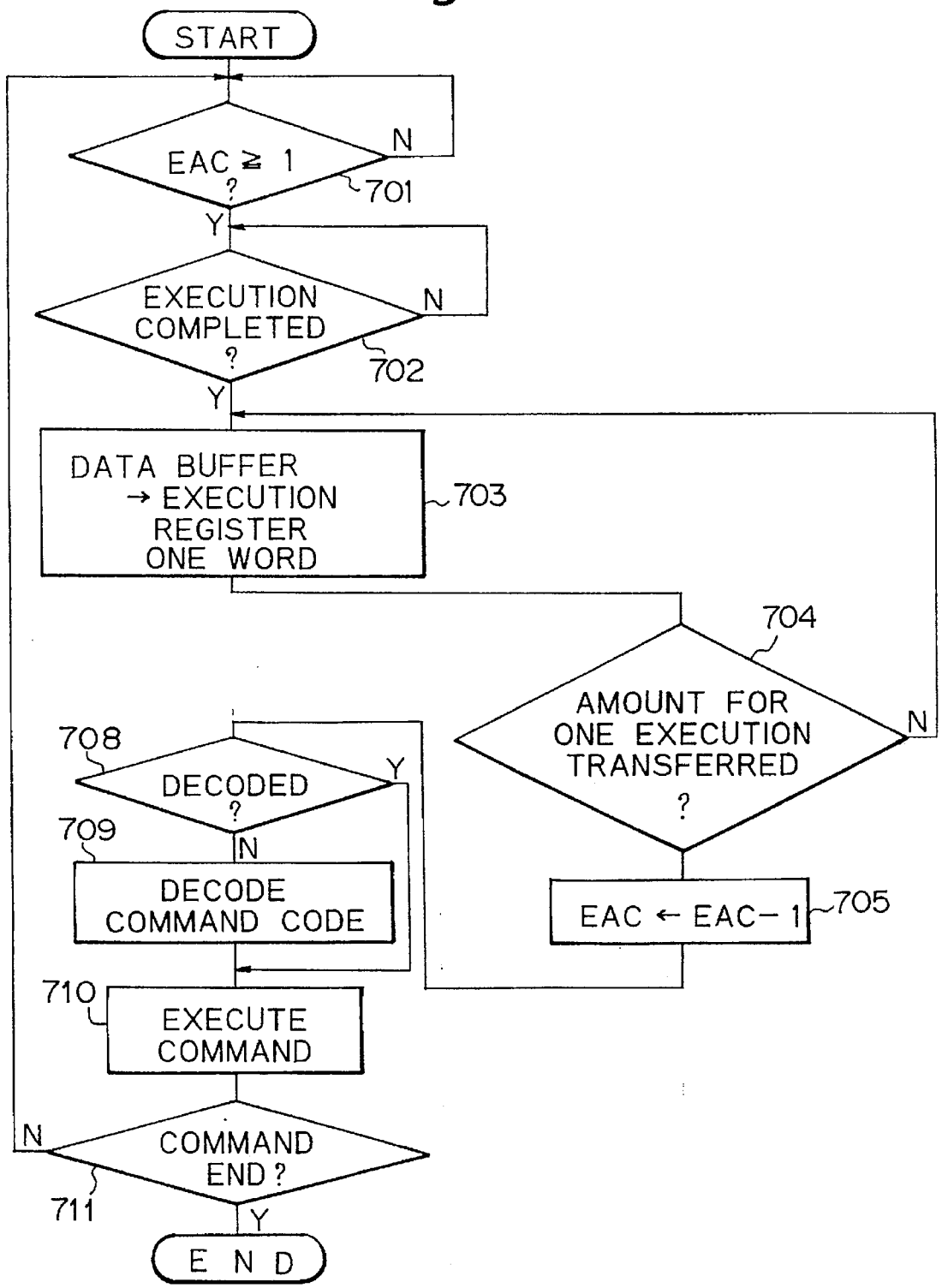
FIG. 18 is a flow chart of the control operation performed by the execution portion 224 in the embodiment of the present invention.

FIG. 18 shows the control operation by the execution portion 224 in the embodiment of the present invention. The operation of FIG. 18 is written based on the construction of the execution unit interface 80 shown in FIG. 15A, but the operation of FIG. 18 is applicable to the construction of FIG. 16 when some portions are changed as explained below.

Initially, in the step 701, it is determined whether or not the count of the up-down counter 235 is equal to or more than one, i.e., the command and parameter buffer memory 210 holds a command word or a basic parameter set which is to be executed. When it is determined YES, it is determined whether or not the execution of data processing for a command and a basic parameter set which is held in the executing command set holding portion 220 is completed, in the step 702. When it is determined YES, a command or parameter word, which is to be used in the next data processing operation in the execution portion 224, is transferred from the command and parameter buffer memory 210 to the execution command set holding portion 220. At this time, when a command word is transferred in the step 703, the count CVC of the up-down counter 233 is decremented, and when a parameter word is transferred in the step 703, the count PVC of the up-down counter 231 is decremented. Or in the construction of FIG. 16, the count CPVC of the up-down counter 239 is decremented when either of a command word and a parameter word is transferred in the step 703. In the step 704, it is determined whether or not an amount of data (command and/or parameter) which is to be used in the next data processing operation in the execution portion 224, has been transferred. When it is determined NO, the operation goes to the step 703, and a next word is transferred. When it is determined YES in the step 704, the count EAC of the up-down counter 235 is decremented in the step 705. Next, in the steps 708 to 710, the command word held in the command code register 221 is decoded, when it has not been decoded yet, and execution of the data processing operation for the command using a basic parameter set which is held in the executing basic parameter set register 223 is performed. In the step 711, it is determined whether or not the execution of data processing for the command set is completed. When it is determined NO, the operation goes to the step 701, or when it is determined YES, the operation of the execution portion 224 ends.

(14) Example of Timing of Operation in the Construction of FIG. 16

Figure 19:
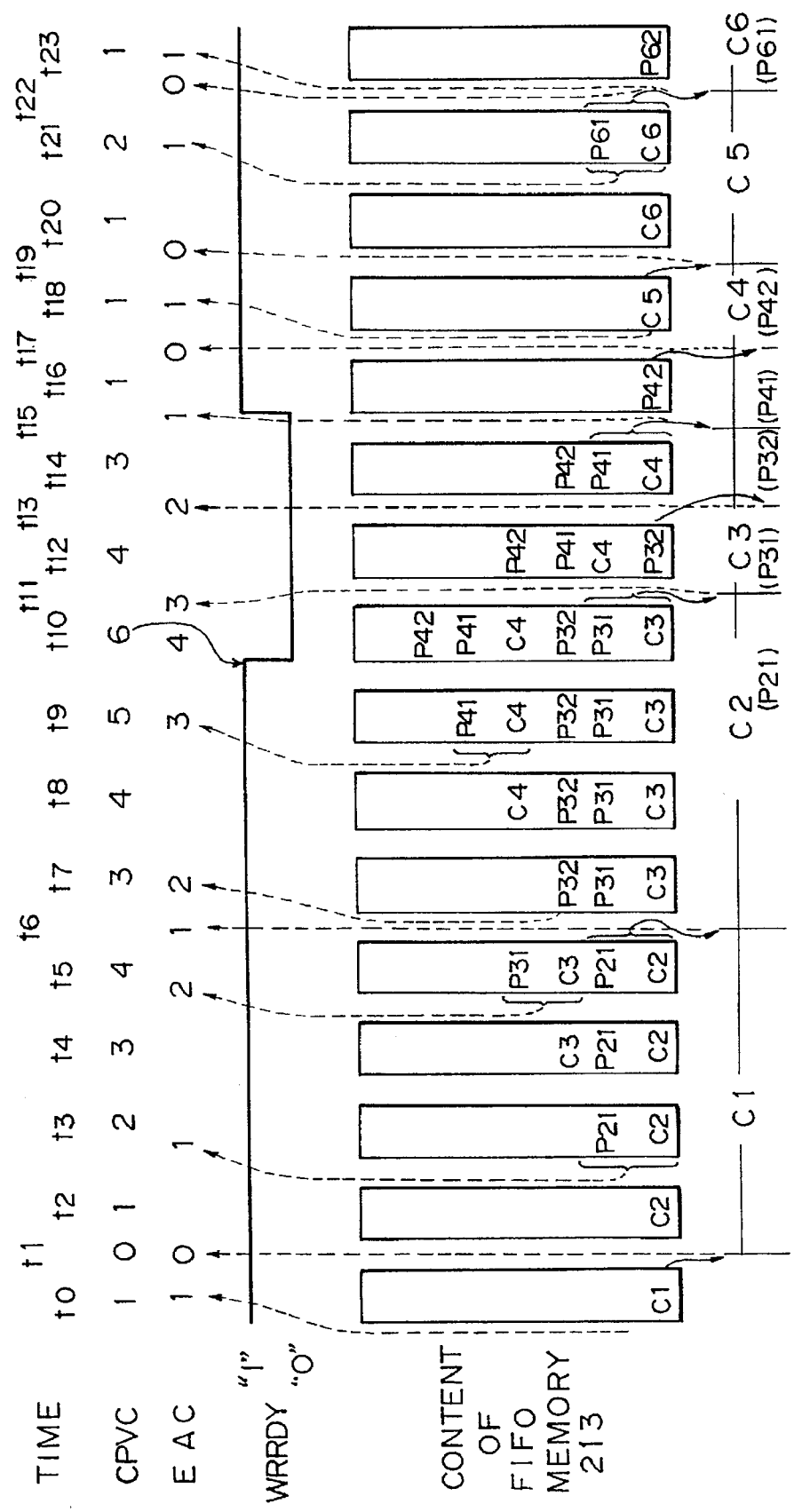
FIG. 19 shows an example of timing of the operation in the construction of FIG. 16.

FIG. 19 shows an example of the timing of the operation in the construction of FIG. 16. For a simple explanation, in FIG. 19, it is assumed that each basic parameter set is comprised of a parameter word.

In FIG. 19, C1, C2, C3 ... each denote a command word, and a corresponding execution period for a command set which begins with the command word. $P_{ij}$ (i=1, 2, 3, ..., j=1, 2, 3, ...) denotes a parameter word in a basic parameter set which follows the command word C1 (i=1, 2, 3, ...).

It is assumed that, in the initial time t0, a command word C1 is prefetched in the command and parameter buffer memory (FIFO memory) 213. The count CPVC is incremented to "1", and as the command word C1 is not followed by a parameter word, the count EAC is incremented to "1".

In the time t1, the command word C1 is fetched into the execution portion 224, and the execution of the command word C1 is commenced. According to the above fetch of the word C1, both the counts of CPVC and EAC are decremented to "0".

In the time t2, the command word C2 which is to be followed by a basic parameter set, comprised of a parameter word P21 only, is prefetched. Corresponding to the prefetch, the count CPVC is incremented to "1" and, as the command word C1 is followed by a parameter word, the count EAC is not changed.

In the time t3, the above parameter word P21, which follows the above command word C2, is prefetched. Corresponding to the prefetch, both the counts CPVC and EAC are incremented to "1".

Similarly, the command word C3 is prefetched in the time t4, and the first basic parameter set P31 is prefetched in the time t5.

In the time t6, responding to the completion of the execution for the command word C1, the command word C2 and the basic parameter set P21 accompanying the command word C2 are fetched into the execution portion 224, and the execution for the command and parameter C2 and P21 is commenced.

The second basic parameter set P32 is prefetched in the time t7, the parameter word C4 is prefetched in the time t8, and the first basic parameter set following the command word C4 is prefetched in the time t9.

When the second basic parameter set P42, which accompanies the command word C4, is prefetched in the time t10, the count CPVC becomes equal to the maximum number "6" of words which can be stored in the FIFO memory 213, and correspondingly, the output of the buffer vacancy detecting circuit 240 becomes active and the Q output of the RS-flip-flop circuit 238, the prefetch allowance signal WRRDY, becomes "0". Accordingly, the prefetch operation is stopped.

In the time t11, responding to the completion of the execution for the command word C2, the command word C3 and the basic parameter set P31 accompanying the command word C3, are fetched into the execution portion 224, and the execution for the command and parameter C3 and P31 is commenced. In the time t13, the basic parameter set P31 accompanying the command word C3, is fetched into the execution portion 224, and the execution for the command and parameter C3 and P32 is commenced.

In the time t15, responding to the completion of the execution for the command word C3, the command word C4 and the basic parameter set P41 accompanying the command word C4 are fetched into the execution portion 224, and the execution for the command and parameter and P41 is commenced. At this time, the count EAC becomes "1", the output of the last operation amount detecting circuit 236 becomes active, and the RS-flip-flop circuit 238 is set to make its Q output active, i.e., the prefetch allowance signal WRRDY becomes active. Thus, the prefetch operation for a next word is restarted.

In the time t17, the basic parameter set P42 accompanying the command word C4 is fetched into the execution portion 224, and the execution for the command and parameter C4 and P42 is commenced. In the time t18, a next command word C5 is prefetched in the FIFO memory 213 by the above restart of the prefetch operation. After the time 18, operations similar to the above are carried out as shown in FIG. 19.

As understood from the example of FIG. 19, according to the present invention, the prefetch operations are continued as long as the capacity of the command and parameter buffer memory 213 allows the continuation, and is stopped as long as the execution portion 224 does not lack data which is to be executed. Thus, the frequency of the operations for requiring an allowance to newly use the system bus 505, and thus the frequency of bus arbitrations, is minimized.

(15) Operations for Various Modes of Command Sets

FIGS. 20 to 23 show examples of various modes of the structures of command sets, other than the structure shown in FIG. 7, where the operation of the parameter counting portion 60 for the command set having the structure shown in FIG. 7, is explained above, in item (9). The aforementioned MODE portion, in each command word as shown in FIG. 10, indicates the above mode of the command set.

As explained before, the operation in the parameter counting portion 60, shown in FIG. 14, is changed in accordance with the MODE information. In the following, the operations of the parameter counting portion 60 shown in FIG. 14, for the various modes of command sets, are explained.

Figure 20:
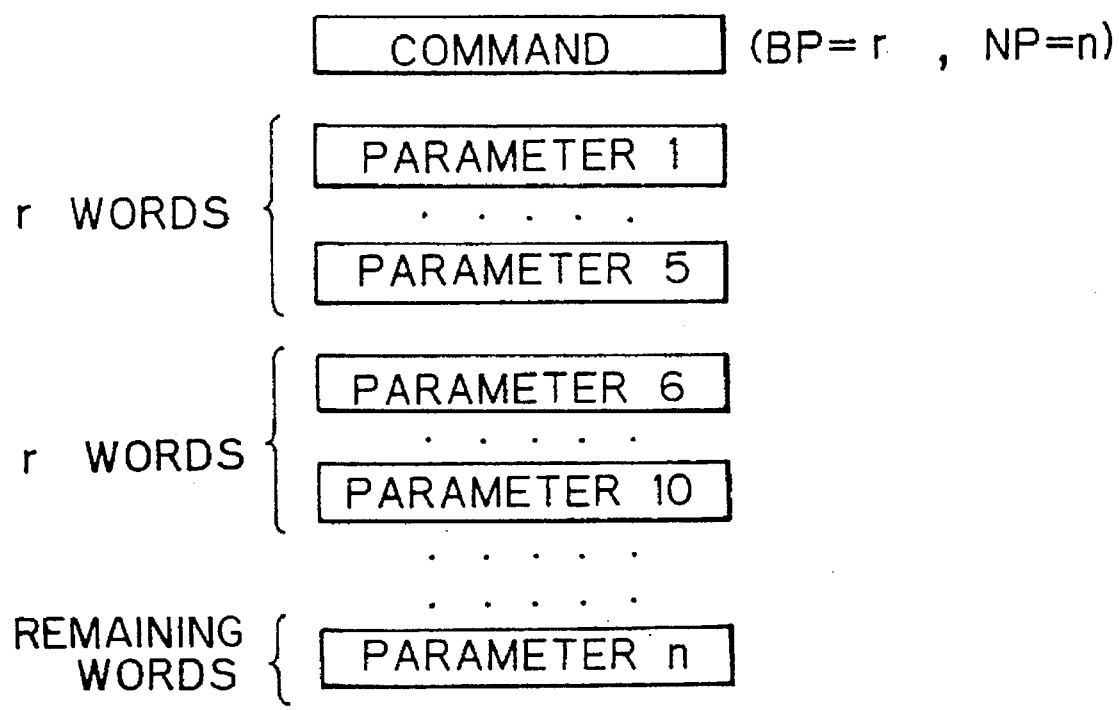
FIGS. 20, 21, 22 and 23 show examples of various modes of the structures of command sets, other than the structure shown in FIG. 7.

The mode of the command set, having a structure shown in FIG. 20, is referred to as MODE II, while the mode of the command set having a structure shown in FIG. 7, is referred to as MODE I.

The command set having a structure shown in FIG. 20 is used in an image data transfer command for transferring image data through the image processor 500 to the graphic memory 503. As shown in FIG. 20, in the structure of FIG. 20, BP=r, and NP=n. In the image data transfer operation, the image data is transferred in parameter words and the maximum amount of data, which can be stored at one time in the command and parameter buffer memory 210, is transferred corresponding to one operation of the execution unit 200. In this example, the maximum amount is assumed to be five words. The above parameter words, containing the maximum amount of data which can be stored at one time in the command and parameter buffer memory 210, are treated as the aforementioned basic parameter set; and thus, r=5 is loaded in the basic parameter counter 62 as a preset value. The above number NP=n is loaded in the repeated number register 65 through the shifter 66 as a preset value. The gate circuit 61, the selector 63, and the shifter 66 are controlled by the aforementioned portion MODE, in the content of the command word, as shown in FIG. 10.

When the command set has a structure as shown in FIG. 20, the gate 61 is open, the selector 63 selects the aforementioned count signal CNT as its output, and the shifter does not shift the above number NP.

According to the above setting, the count of the basic parameter counter 62 indicates the number of parameter words which have not been prefetched yet in every five parameter words which are to be transferred. When all the parameter words have been prefetched, the basic parameter counter 62 outputs an active parameter zero signal.

The count of the repeating number counter 64 indicates the number of parameter words which have been already prefetched, of all the parameter words which are to be transferred. The accord detecting circuit 79 compares the count of the repeating number counter 64 and the output of the repeating number register 65. When all the parameter words of all the parameter words have been prefetched, the accord detecting circuit 79 outputs a command set prefetch complete signal NPEND. The logical sum, of the output of the basic parameter counter 62 and the output of the accord detecting circuit 79, is obtained in the OR circuit 67, and is output as a signal BPEND to the micro ROM 71 in the command fetch control portion 70 and to the execution unit interface 80. Thus, the BPEND signal becomes active every time a set of five parameter words is prefetched (i.e., a prefetch of a basic parameter set is completed), or when all the parameter words, which are to be transferred, are prefetched.

The output of the repeating number counter 64 is also input into the FIFO memory 69. The FIFO memory 69 and the executing parameter number register 68 are provided to hold the number of parameter words which have been already prefetched, of all the parameter words which are to be transferred, when an exceptional condition occurs. All of the set of parameter words which have been prefetched are stored in the command and parameter buffer memory in the execution unit 200 until the image data in the set of parameter words are processed in the the execution unit 200. The set of parameter words which are stored in the command and parameter buffer memory in the execution unit 200 are at the same time held in the FIFO memory 69 and the number, indicating the set of parameter words regarding which the data processing is executed in the execution unit 200, is held in the executing parameter number register 68. To realize the above, a signal PEXE, which is output from the execution unit 200 when the execution unit 200 inputs a new set of parameter words to be executed, is applied to the FIFO memory 69 and the executing parameter number register 68 for providing an output control of the FIFO memory 69 and an input control of the executing command register 68, respectively. Regarding the exception processing, a further explanation is given later.

Figure 21:
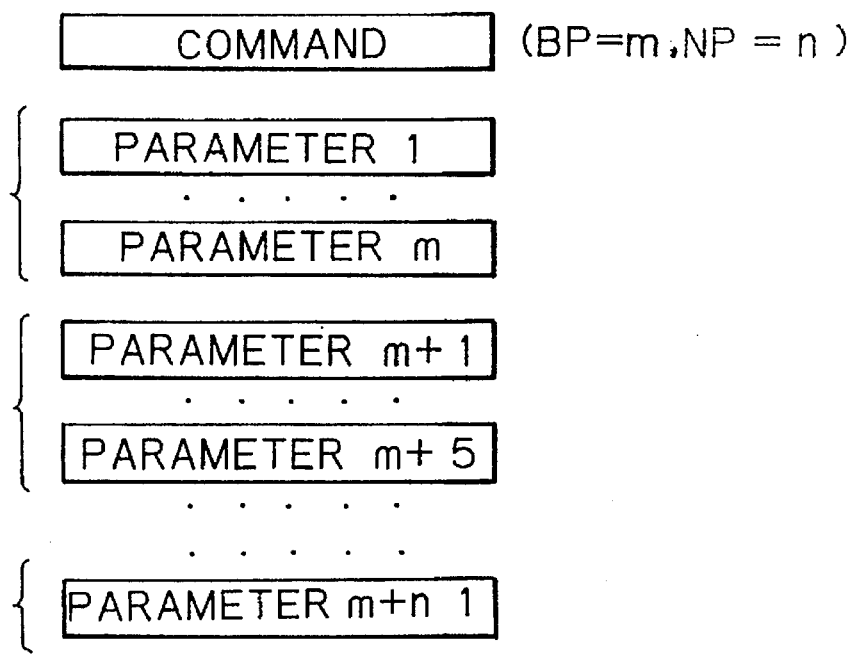

The mode of the command set having a structure shown in FIG. 21, is referred to as MODE III.

The command set, having a structure shown in FIG. 21, is used in a command for drawing a poli-line (a series of line segments where an end point of each line segment is connected to the beginning point of an adjacent line segment), or a command for drawing a trapezoid.

The structure of MODE III comprises a basic parameter set at the top, and the structures of the other parameters following the basic parameter set are the same as the MODE II. For example, in the command for drawing a poli-line, the first basic parameter set contains two parameter words for drawing a first line segment as shown in FIG. 8, but each of the other parameter words, following the first basic parameter set, contains a coordinate of an end point of the next line segment. Therefore, the setting of the BP is changed after completion of the prefetch of the first basic parameter set.

Figure 22:
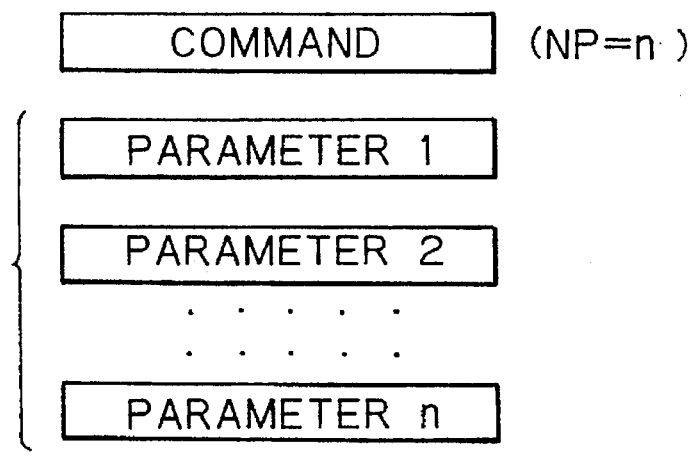

The mode of the command set having a structure shown in FIG. 22, is referred to as MODE IV.

The command set having a structure shown in FIG. 22, is used in a command for transferring a predetermined number of parameter words, for example, to write values contained in the parameter words in corresponding internal registers, respectively. The data fetched by the command set having a structure of MODE IV, is not transferred to the execution unit 200.

For the operation of MODE IV, the count of the basic parameter counter 62 is not used. The selector 63 selects the aforementioned count signal CNT as its output, the shifter does not shift the above number NP, and therefore the above predetermined number NP=n is loaded in the repeated number register 65.

The count of the repeating number counter 64 indicates the number of parameter words which have been already transferred, of all the parameter words which are to be transferred. The accord detecting circuit 79 compares the count of the repeating number counter 64 and the output of the repeating number register 65. When all the parameter words of all the parameter words have been transferred, the accord detecting circuit 79 outputs a command set prefetch complete signal NPEND.

Figure 23:
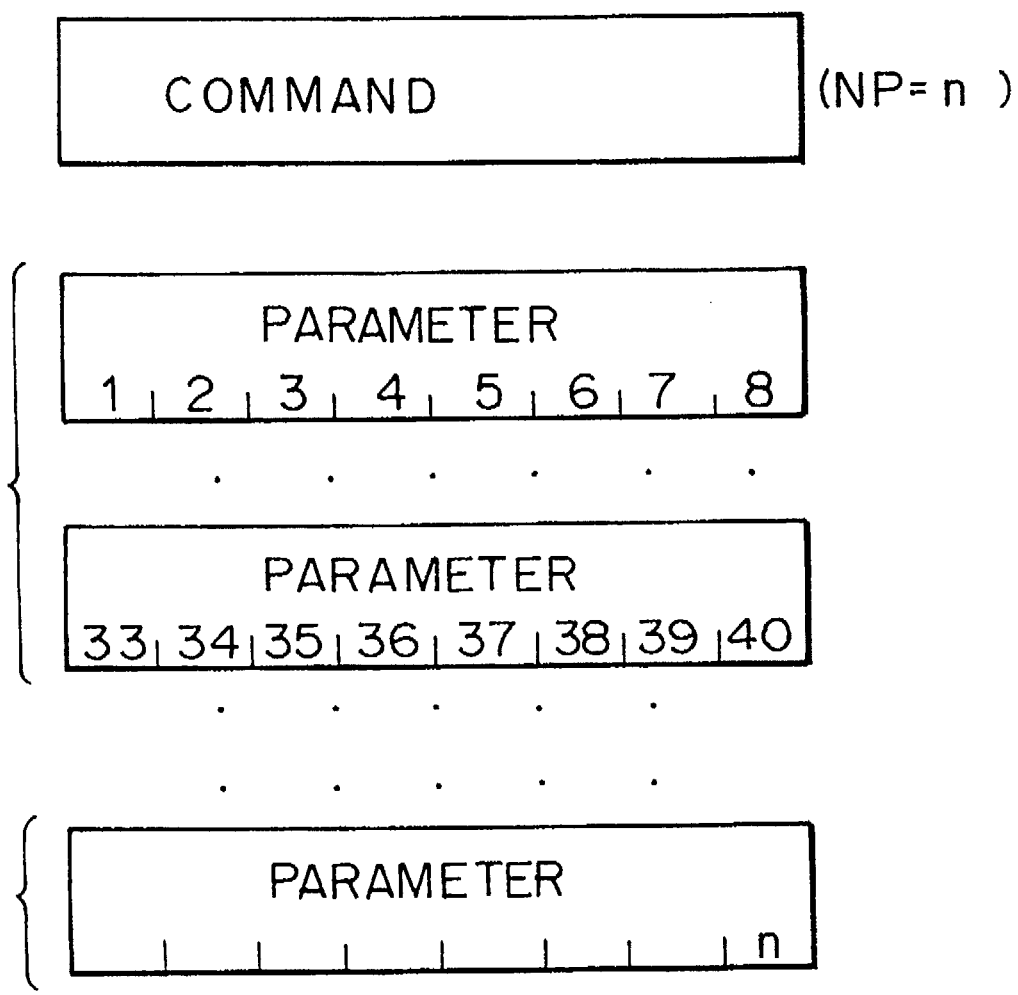

The mode of the command set having a structure shown in FIG. 23, is referred to as MODE V. In the structure of MODE V, a plurality of parameters are contained in each parameter word. In the example of FIG. 23, each parameter word contains eight sets each of a four-bit parameter. The four-bit parameter is used for a called step command which indicates a relative displacement in the X-direction, +1, 0, or −1, and a relative displacement in the Y-direction, +1, 0, or −1, where two bits are used to indicate the displacement value +1, 0, or −1, in each of the X- and Y-directions.

When the command set has a structure as shown in FIG. 20, the gate 61 is open, the selector 63 selects the output of the basic parameter counter 62 as its output, and the shifter does not shift down the above number NP by the above number of parameter sets contained in each parameter word.

In the operation of MODE V, the parameter words are transferred to the execution unit 200 in basically the same way as the operation of MODE II. Namely, the the above four-bit parameter sets are transferred in the thirty-two bit parameter words and the maximum amount of data, which can be stored at one time in the command and parameter buffer memory 210, is transferred into the execution unit 200. In this example, the maximum amount is assumed to be five words. The above parameter words containing the maximum amount of data, which can be stored at one time in the command and parameter buffer memory 210, is treated as the aforementioned basic parameter set; and thus, r=5 is loaded in the basic parameter counter 62 as a preset value. The number NP=n, which is contained in each command word, indicates the total number of the above four-bit sets of parameters. The number NP is eight-bit shifted through the shifter 66, and is loaded in the repeating number register 65 as a preset value. The gate circuit 61, the selector 63, and the shifter 66 are controlled by the aforementioned portion MODE in the content of the command word as shown in FIG. 10.

According to the above setting, the count of the basic parameter counter 62 indicates the number of parameter words which have not been prefetched yet in every five parameter words which are to be transferred. When all the parameter words have been prefetched, the basic parameter counter 62 outputs an active parameter zero signal.

The count of the repeated number counter 64 indicates the number of parameter words which have been already prefetched of all the parameter words which are to be transferred. The accord detecting circuit 79 compares the count of the repeated number counter 64 and the output of the repeated number register 65. When all the parameter words of all the parameter words have been prefetched, the accord detecting circuit 79 outputs a command set prefetch complete signal NPEND. The logical sum of the output of the basic parameter counter 62, and the output of the accord detecting circuit 79 is obtained in the OR circuit 67, and is output as a signal BPEND to the micro ROM 71 in the command fetch control portion 70 and to the execution unit interface 80. Thus, the BPEND signal becomes active every time a set of five parameter words are prefetched (a prefetch of a basic parameter set is completed) or when all the parameter words, which are to be transferred, are prefetched.

The output of the repeated number counter 64 is also input into the FIFO memory 69. The FIFO memory 69 and the executing parameter number register 68 are provided to hold the number of parameter words which have been already prefetched, of all the parameter words which are to be transferred, when an exceptional condition occurs. The set of parameter words which are stored in the command and parameter buffer memory in the execution unit 200 are at the same time held in the FIFO memory 69, and the number indicating the set of parameter words, regarding which the data processing is executed in the execution unit 200, is held in the executing parameter number register 68. To realize the above, a signal PEXE, which is output from the execution unit 200 when the execution unit 200 inputs a new set of parameter words to be executed, is applied to the FIFO memory 69 and the executing parameter number register 68, providing for an output control of the FIFO memory 69 and for an input control of the executing command register 68, respectively. Regarding the exception processing, a further explanation is given later.

(16) Construction for Initializing Internal Registers

The aforementioned co-processors, which are provided to take over a part of the work of a central processor to enhance capability of the central processor, such as an image processor or an arithmetic processor, comprise internal registers which require initialization before executing data processing.

For example, in image processors, an interrupt mask register for setting a mask against an interrupt to the CPU, a refresh cycle register for defining a refresh cycle of a refresh memory wherein image data is stored, a stack pointer for storing an address to return to, when a subroutine is executed, a synchronizing signal pulse width register for storing a pulse width of horizontal and vertical synchronizing signals which are used in a CRT display device, a back porch register for storing a back porch width, a cycle register for storing cycles of horizontal and vertical synchronizing signals, a current display width register for storing a width of a real space on the display plane, the virtual space register for storing a memory space wherein the data to be displayed is memorized, a split screen register for storing a location to display a split screen, a split screen address register for storing an address of a split screen, and the like, are internal registers which require initialization before executing data processing.

In the conventional image processor, the initialization of the internal registers is carried out under the control of the central processor in the system wherein the image processor is installed. Therefore, the load on the CPU at the initialization of the system is heavy, and total initialization time of the system is large.

Figure 24:
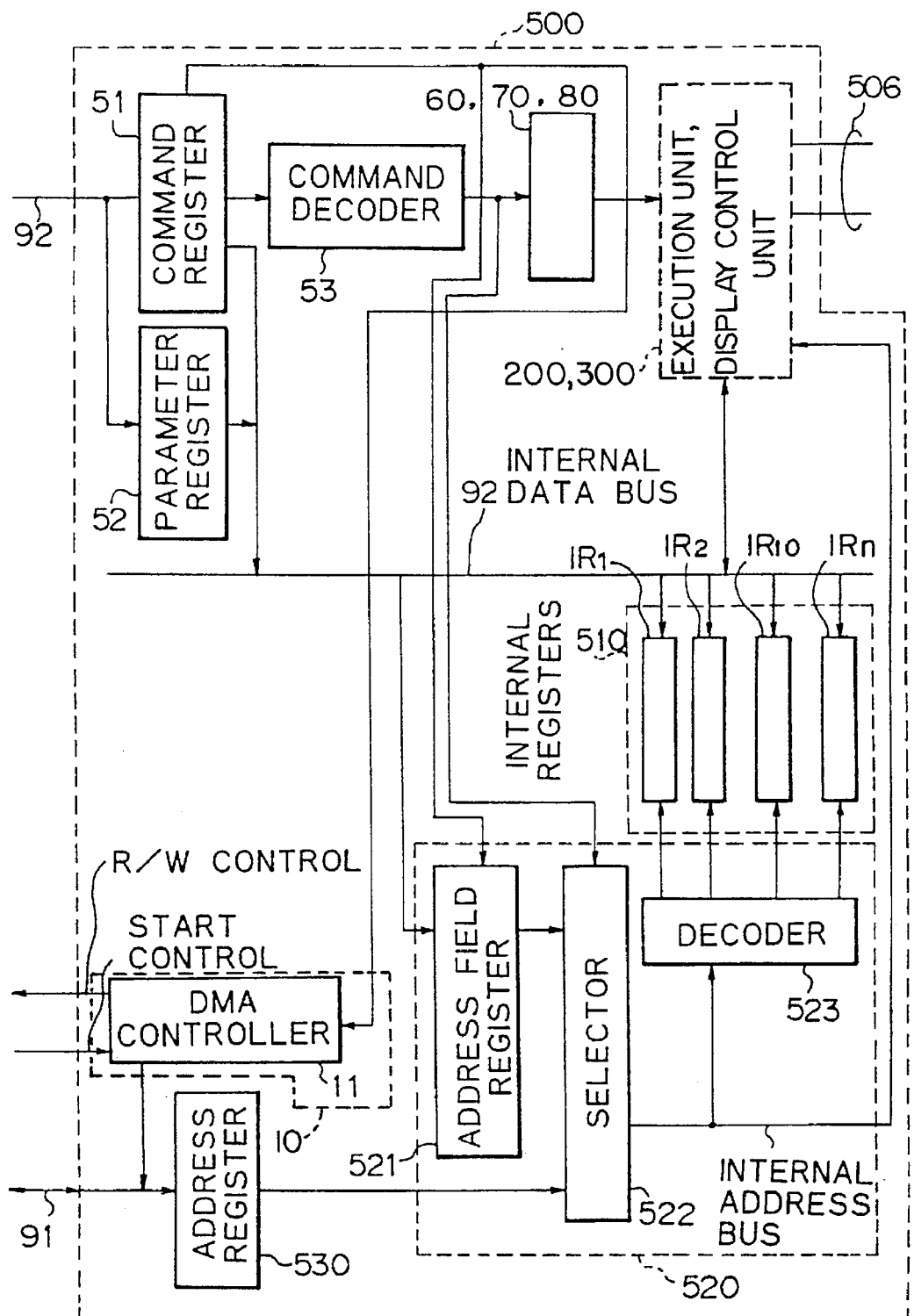
FIG. 24 shows an additional construction for initializing internal registers in the image processor 500.

FIG. 24 shows an additional construction of the image processor 500 in the embodiment of the present invention.

In FIG. 24, the same reference numerals as explained before denote the same respective components as before. Reference numeral 11 denotes a DMA controller, 530 denotes an address register, 521 denotes an address field register, 522 denotes a selector, 523 denotes a decoder, and IR1, IR2, . . . IRn each denote an internal register.

The internal registers IR1, IR2, . . . IRn are respectively located in the execution unit 200 and the display control unit 300 in the image processor 500.

In the construction of FIG. 24, the construction which is encircled by a dashed line 520 is additionally provided in the construction of FIG. 24.

The DMA controller 11 is contained in the access control circuit 10 (FIG. 3A). The address register 530 is provided on the internal address bus 91, and when the CPU 501 (FIG. 1) accesses one of the internal registers IR1, IR2, . . . IRn, the address signal of the internal register, which is supplied from the CPU 501 is latched in the address register 530, and the output of the address register 530 is applied to the decoder 523 through the selector 522. The decoder 523 decodes the applied address, and outputs an active input control signal to the corresponding internal register.

In initialization, the CPU 501 sends a start control signal to the DMA controller 11. Responding to the signal, the micro ROM 71 in the command fetch control portion 70 controls to fetch a predetermined address in the command and parameter memory 502 (FIG. 1) by controlling the DMA controller 11. The command word transferred from the command and parameter memory 502, is first latched in the command register 51, and is decoded in the command decoder 53. When it is determined that the command is not an internal register initialization command, the aforementioned prefetch operation is carried out.

When it is determined that the command is an internal register initialization command, the micro ROM 71 controls the address field register 521 to input the aforementioned portion REGISTER ADDRESS in the command word as shown in FIG. 10, through the internal data bus 92, and controls the selector 522 to select the output of the address field register 521. The portion REGISTER ADDRESS indicates the address of the internal register in which an initial value is to be written. The address which is applied to the decoder 523 through the selector 522, is decoded in the decoder 523, and an input control signal is output from the decoder 523 to the addressed internal register. The initial value is in advance written by the CPU 501 in the next address in the command and parameter memory 502. Therefore, the initial value is fetched into the parameter register 52 by the next fetch operation, and is supplied on the internal data bus 92. Thus, the initial value is written in the addressed internal register. Repeating operations similar to the above, all the internal registers IR1, IR2, . . . IRn are initialized.

(17) Exception Processing

When an exception arises in the central processor, the central processor carries out exception processing by itself. However, when an exception arises in a device other than the central processor, the exception is informed to the central processor by an interrupt processing. Responding to the information on the exception, the central processor carries out exception processing with regard to the device. In the exception processing, the central processor must know which command is in execution, and which parameter is in execution when the exception arose. Further, when the device is debugged, the command and parameter which are in execution, must be known.

In the embodiment of the present invention, as explained before with reference to FIG. 11, the command word, which is executed in the execution unit 200 when an exceptional condition occurs, is held in the executing command register 56. As explained before with reference to FIG. 12, the address of the command word, which is executed in the execution unit 200 when an exceptional condition occurs, is held in the executing command register 46. Further, as explained before with reference to FIG. 14, the number of the basic parameter set, which is executed in the execution unit 200 when an exceptional condition occurs, is held in the executing parameter number register 68.

(18) Prefetches in Master Mode and Slave Mode

In the construction of FIGS. 3A and 3B, it is assumed that the prefetch operations are carried out under the control of the micro ROM 71 using the DMA function of the access control circuit 10. The above prefetch operation under the control of the micro ROM 71 is called master mode. Alternatively, in a so-called slave mode, the prefetch operations, and in particular the operations for starting and stopping prefetch based on the control signals generated in the control circuits provided in the execution unit 200 and the prefetch unit 100, can be carried out under the control of the CPU 501 using a similar construction to that explained above, while, in the master mode, the prefetch operations are controlled by the micro ROM 71 as explained before. Namely, in the slave mode, the CPU 501 takes the place of the micro ROM 71 regarding the control of the prefetch operations.

(19) Application to Other Data Processing Systems

Although the above explanations are made for an image processing system comprising an image processor, as readily understood, all the characteristic features of the present invention do not directly relate to the executions of the commands in the execution portion 224 in FIGS. 15A and 15B, or FIG. 16, except reading (fetching) of commands and parameters; therefore, the present invention is applicable to all data processing systems comprising a data processing device for carrying out data processing and is not limited to image data processing.

We claim:

1. A scalar data processing device for carrying out data processing, in accordance with data input thereto from a source external of said data processing device, the data comprising one or more commands and one or more parameters which may accompany respective said commands, the data processing device comprising:

data buffer means for storing one or more of said commands and/or one or more of said parameters until each of said stored commands and stored parameters is read out therefrom;

prefetch control means for controlling a prefetch operation of prefetching data, including a command and/or one or more parameters, from said external source and supplying each said prefetched command and/or one more parameter to said data buffer means, said data buffer means storing each said prefetched command and parameter, as supplied thereto by said prefetch control means, until read out therefrom;

execution means for reading out from said data buffer means and receiving, as an input therein, the oldest one of the prefetched commands currently stored in said data buffer means upon completing execution of a preceding command, and for reading out from said data buffer means, and receiving as an input therein, each of the one or more prefetched parameters associated with the oldest one of the prefetched command and currently stored in said data buffer means when the command, as input therein, requests the accompanying one or more parameters, and for executing the command, as input therein, using the accompanying parameters when the accompanying parameters are requested by the respective command and accordingly input therein;

insufficient space detecting means for detecting a first state of said data buffer means in which first state there is not enough vacant space in the data buffer means in which a further, prefetched command and/or parameter can be stored; and least data detecting means for detecting a second state of said data buffer means in which second state the data buffer means does not store data, said data including a command and/or a parameter and which is necessary for a next operation of said execution means; and said prefetch control means, in response to the detection of said second state by said second state detecting means, starting said prefetch operation and continuing successive said prefetch operations until said first detecting means detects said first state and, further, in response to the detection of said second state, stopping further said prefetch operations.

2. A scalar data processing device according to claim 1, further comprising a command and parameter memory for storing said commands and accompanying parameters in the order in which the commands are executed, and in which the accompanying parameters are used in the execution of each respective command, by the execution means.

3. A scalar data processing device according to claim 2, wherein each of said commands contains information as to the format of the parameter sets accompanying the command, the number of said accompanying parameter sets, and the data length of each of the accompanying parameter sets.

4. A scalar data processing device according to claim 3, further comprising:
  command decode means for detecting the format of said parameter sets; and
  data length counting means for counting the number of operations of prefetching the parameter sets.

5. A scalar data processing device according to claim 2, further comprising:
  one or more internal registers which are requested to be initialized, one or more initialization commands being storable in said command and parameter memory, said initialization commands respectively containing internal addresses of said one or more internal registers; and
  each of said initialization commands selectively having accompanying parameter data which contains initialization data which is to be written in a corresponding internal register, in said command and parameter memory.

6. A scalar data processing device according to claim 5, wherein said prefetch control means comprises:
  command decode means for determining whether or not a command, fetched from said command and parameter memory, is said initialization command;
  parameter register means for receiving said initialization data therein;
  address field register means for holding an internal address contained in a respective initialization command;
  address decoder means for receiving and decoding the internal address thereby to output an internal address control signal to the internal register which is addressed by the internal address;
  switching means for outputting a selected one of an address signal supplied from the external source and the output of said address field register means; and
  initialization control means for controlling said switching means to select the output of said address field register means, as its own output, when the command decode means determines that the command fetched is an initialization command.

7. A scalar data processing device as recited in claim 2, wherein said data processor device is connected to said source through a bus, further comprising:
  bus grant obtaining means for obtaining a grant of use of said bus, and said bus grant obtaining means being activated in response to said detection of the second state by the least data detection means.

8. A scalar data processing device according to claim 1, wherein said execution means further comprises:
  a first port, connected to a first bus through said prefetch control means, for inputting said commands and parameters; and
  a second port, connected to a second bus, for outputting results of the execution on the second bus.

9. A scalar data processing device as recited in claim 8, wherein said data processor device is connected to said source through a bus, further comprising:
  bus grant obtaining means for obtaining a grant of use of said bus, and said bus grant obtaining means being activated in response to said detection of the second state by the least data detection means.

10. A scalar data processing device as recited in claim 1, wherein said data processor device is connected to said source through a bus, further comprising:
  bus grant obtaining means for obtaining a grant of use of said bus, and said bus grant obtaining means being activated in response to said detection of the second state by the least data detection means.

11. A scalar data processing device for carrying out data processing, in accordance with data input thereto from a source external of said device, the data comprising one or more commands and one or more parameters which may accompany respective said commands and further comprising a branch command, the data processing device comprising:
  data buffer means for storing one or more of said commands and/or one or more of said parameters until each of said stored commands and stored parameters is read out therefrom;
  prefetch control means for controlling a prefetch operation of prefetching data, including a command and/or one or more parameters, from said external source and supplying each said prefetched command and/or one more parameter to said data buffer means, said data buffer means storing each said prefetched command and parameter, as supplied thereto by said prefetch control means, until read out therefrom;
  execution means for reading out from said data buffer means and inputting therein the oldest one of the prefetched commands, as currently stored in said data buffer means and upon completing the execution of a preceding command, and for reading out from said data buffer means and inputting therein each of the one or more prefetched parameters associated with the oldest one of the prefetched command and currently stored in said data buffer means when the command, as input therein, requests the accompanying one or more parameters, and for executing the command, as input therein, using the accompanying parameters when the accompanying parameters are requested by the respective command and accordingly input therein;
  insufficient space detecting means for detecting a first state of said data buffer means in which first state there is not enough vacant space in the data buffer means in which a further, prefetched command and/or parameter can be stored;
  least data detecting means for detecting a second state of said data buffer means in which second state the data buffer means does not store data, said data including a command and/or a parameter and which is necessary for a next operation of said execution means;
  said prefetch control means, in response to the detection of said second state by said second state detecting means, starting said prefetch operation and continuing successive said prefetch operations until said first detecting means detects said first state and, further, in response to the detection of said second state, stopping further said prefetch operations;
  said prefetch control means further comprising branch command detecting means for detecting a branch command, as one of the prefetched commands, said prefetch control means responding to the detection of a prefetched branch command for stopping further said prefetch operations until completion of the execution of said branch command by said execution means;

a command and parameter memory which stores said commands and accompanying parameters in the order in which the commands are to be executed, and in which the accompanying parameters are used in the execution of each respective command, by the data processing device;

means, responsive to a requirement of performing successive executions of a command and wherein successive command executions use respective, accompanying parameter sets, each parameter set comprising one or more parameters, for storing the command in said command and parameter memory, followed by the respective parameter sets used in the successive executions of the command, and wherein said command contains information as to the number of said respective parameter sets and the data length of each thereof;

command decode means for decoding each prefetched command which is input into the execution means and, thereby, for detecting said number of respective parameter sets and the data length of each of the respective parameter sets from the prefetched command;

data length counting means for counting the length of each prefetched data and thereby for detecting the end of each said prefetched parameter set; and parameter set number counting means for counting the number of parameter sets which are prefetched into said data buffer and thereby for determining whether a command has been prefetched or a parameter set has been prefetched, and whether or not each parameter set accompanying a respective command has been prefetched.

12. A scalar data processing device according to claim 11, further comprising:

parameter number first-in, first-out ("FIFO") means for inputting the number count of said parameter set number counting means and for outputting its own oldest number count content into said executing parameter number register means and thereby for holding a number count indicating the parameter set which is currently in execution; and executing parameter number register means for receiving and holding the number count, output by the parameter number FIFO means, and responsive to an input of a new parameter set into said execution means for being renewed thereby.

13. A scalar data processing device according to claim 11, wherein said data buffer means further comprises a first-in, first-out memory into which prefetched commands and respective, accompanying parameters are input, in the order in which said prefetched commands and respective, accompanying parameters are prefetched.

14. A scalar data processing device according to claim 13, wherein:

said insufficient space detecting means comprises means for incrementing a count responding to a prefetch of every unit length of commands and accompanying parameters for detecting an amount of data currently held in the data buffer means, and for decrementing the count responding to an input of every unit length of command and accompanying parameters into said execution means; and said least data detecting means comprises means for incrementing a count when a command which is not followed by an accompanying parameter is prefetched, and when each parameter set which is prefetched, and for decrementing the count when a command which is not followed by an accompanying parameter is input into said execution means, and when each parameter set is input into said execution means, for decrementing the count.

15. A scalar data processing device according to claim 11, wherein:

said data buffer means further comprises command buffer means for temporarily storing said prefetched commands and parameter buffer means for temporarily storing said prefetched parameters; and said data processing device further comprises command buffer input control means for controlling the input of a prefetched command into said command buffer means based on the output of said parameter set number counting means and parameter buffer input control means for controlling the input of a prefetched parameter set into said parameter buffer means, based on the outputs of said data length counting means and said parameter set number counting means.

16. A scalar data processing device according to claim 15, wherein:

said insufficient space detecting means further comprises:
command buffer amount counter means for incrementing the count thereof in response to every prefetch of a command, decrementing the count thereof in response to every input of a command into said execution means and detecting a third state wherein insufficient vacant space exists in the command buffer means for storing a further command, parameter buffer amount counter means for incrementing the count thereof in response to every prefetch of a unit length of parameters, and decrementing the count thereof in response to every input of a unit length of parameters into said execution means, and detecting a fourth state wherein insufficient vacant space exists in the parameter buffer means for storing a further parameter, and logical OR means for detecting each of said third and fourth states; and said least data detecting means comprises means for incrementing a count when a command having no accompanying parameter is prefetched and when each parameter set is prefetched, and for decrementing the count when a command having no accompanying parameter is input into said execution means and when each parameter set is input into said execution means.

17. A scalar data processing device according to claim 11, wherein:

said prefetch control means comprises an address generating means for supplying an address for prefetching, selectively, one of a command and a parameter;

said address calculation means comprises an address generating means, a command address first-in, first-out means and an executing command address register means; and said command address first-in, first-out means, further, inputs the output of said address calculation means and outputs its own oldest content into said executing command address register means thereby for holding the address of a command which is currently in execution, the content of said executing command address register means being renewed in response to an input of a new command into said execution means.

18. A scalar data processing device according to claim 11, wherein said prefetch control means further comprises:

command register means for temporarily holding a prefetched command;

command first-in, first-out means for inputting the output of said command register means and for outputting its own oldest content into said executing command register means; and executing command register means for holding a command which is currently in execution, the content of said executing command register means being renewed in response to an input of a new command into said execution means.

19. A scalar data processing system for carrying out data processing, in accordance with one or more commands and using one or more parameters accompanying respective said commands, as input thereto from an external source, comprising:

a data processing device which inputs said commands and respective, accompanying parameters from said external source thereof and carries out data processing in accordance with the commands which are input thereto, using said respective, accompanying parameters, and comprising:

data buffer means for storing one or more commands and/or one or more respective, accompanying parameters, until each of said commands and respective, accompanying parameters is read out therefrom, prefetch control means for controlling a prefetch operation of prefetching data, including a command and/or one or more respective, accompanying parameters from said external source and supplying the prefetched data to said data buffer means, said data buffer means storing each said command and parameter of said prefetched data as supplied thereto by said prefetch control means until being read out therefrom, and execution means for inputting therein the oldest one of the commands, as currently stored in said data buffer means, upon completing the execution of a preceding command and for reading out, and inputting therein, each of the accompanying one or more parameters stored in said data buffer means when the respective command, as input therein, requests the accompanying one or more parameters, and for executing the command, as input therein, using the accompanying one or more parameters when requested by the respective command and accordingly input therein and wherein, when successive parameter sets, each comprised of one or more parameters, are used in respective, successive executions of a respective command in the execution means, said command contains information on the number of said successive parameter sets and information on the data length of each thereof;

command decode means for decoding the command which is input into the execution means and for detecting from the decoded command said number of respective, accompanying parameter sets and the data length of each thereof;

data length counting means for counting the length of the data of, and thereby for detecting an end of, each of said prefetched parameter sets; and parameter set number counting means for counting the number of parameter sets which are prefetched into said data buffer thereby for determining whether a command has been prefetched or a parameter set has been prefetched and whether or not each parameter set accompanying and following a respective command has been prefetched.

20. A scalar data processing system according to claim 19, further comprising:

parameter number first-in, first-out means for inputting the number count of said parameter set number counting means and for outputting its own oldest number count content and thereby for holding a number count indicating the parameter set which is currently in execution; and executing parameter number register means for receiving and holding the number count output by the parameter number first-in, first-out means and for responding to and being renewed by each new parameter set input into said execution means.

21. A scalar data processing system according to claim 19, wherein said data buffer means further comprises a first-in, first-out memory and into which prefetched commands and parameters are input in the order in which said prefetched commands and said respective, accompanying parameters are prefetched.

22. A scalar data processing system according to claim 19, wherein:

said data buffer means further comprises command buffer means for temporarily storing said prefetched commands and parameter buffer means for temporarily storing said prefetched, respective and accompanying parameters; and said data processing system further comprises command buffer input control means for controlling the input of a prefetched command into said command buffer means, based on the output of said parameter set number counting means, and parameter buffer input control means for controlling the input of a prefetched parameter set into said parameter buffer means, based on the outputs of said data length counting means and said parameter set number counting means.

23. A scalar data processing system according to claim 19, wherein:

said prefetch control means comprises an address generating means for obtaining an address for prefetching a command or a parameter;

said address calculation means comprises an address generating means, a command address first-in, first-out means and an executing command address register means; and said command address first-in, first-out means, further, inputs the output of said address calculation means and outputs its own oldest content into said executing command address register means thereby for holding the address of a command which is currently in execution, the content of said executing command address register means being renewed in response to an input of a new command into said execution means.

24. A scalar data processing system according to claim 19, wherein said prefetch control means further comprises:

command register means for temporarily holding a prefetched command;

command first-in, first-out means for inputting the output of said command register means and outputting its own oldest content into said executing command register means; and executing command register means for holding a command which is currently in execution, the content of said executing command register means being renewed in response to an input of a new command into said execution means.

25. A scalar data processing system according to claim 19, wherein:

said command and parameter memory stores said commands and respective, accompanying parameters in the order the commands are executed and the respective, accompanying parameters are used in the data processing device;

said command further contains information on a format of the parameter sets and the data length of each of the parameter sets accompanying the command.

26. A scalar data processing system according to claim 25, wherein said command decode means, further, detects the format of said parameter sets, further comprising data length counting means for counting a number of operations of prefetching the parameter sets.

27. A scalar data processing system for carrying out data processing, in accordance with one or more commands and using one or more parameters accompanying respective said commands, as input thereto from an external source, comprising:

a command and parameter memory; and a data processing device which inputs said commands and parameters from said external source thereof and carries out data processing in accordance with the commands which are input thereto, using said respective, accompanying parameters, and comprising:

data buffer means for storing one or more commands and/or one or more respective, accompanying parameters, until each of said commands and respective, accompanying parameters is read out therefrom;

prefetch control means for controlling a prefetch operation of prefetching data, including a command and/or one or more respective, accompanying parameters from said external source and supplying said data to said data buffer means, said data buffer means storing each said command and respective, accompanying parameter as supplied thereto by said prefetch control means until being read out therefrom; and execution means for inputting therein the oldest one of the commands, as currently stored in said data buffer means, upon completing the execution of a preceding command and for reading out, and inputting therein, each of the respective, accompanying one or more parameters stored in said data buffer means when the respective command, as input therein, requests the respective, accompanying one or more parameters, and for executing the command, as input therein, using the respective, accompanying one or more parameters when requested by the respective command and accordingly input therein;

said command and parameter memory storing said commands and respective, accompanying parameters in the order in which the commands are executed and in which the respective, accompanying parameters are used in the data processing device; and said data processing device further comprising one or more internal registers which are requested to be initialized, one or more initialization commands being storable in said command and parameter memory and said initialization commands respectively containing internal addresses of said internal registers and each being followed by parameter data which contains initialization data which is to be written in a corresponding internal register, in said command and parameter memory.

28. A scalar data processing system according to claim 27, wherein said prefetch control means comprises:

command decode means for determining whether or not a command fetched from said command and parameter memory is an initialization command;

parameter register means for receiving said initialization data therein;

address field register means for holding an internal address contained in a respective initialization command;

address decoder means for receiving an input and decoding the received input thereby for outputting an input control signal to the internal register which is addressed by the internal address;

switching means for outputting either of an address signal supplied from the external source and the output of said address field register means; and initialization control means for controlling said switching means to select the output of said address field register means, as its own output, when an initialization command is determined.

29. A scalar data processing system for carrying out data processing, in accordance with one or more commands, using one or more parameters accompanying respective said commands, comprising:

a command and parameter memory; and a data processing device which inputs said commands and respective, accompanying parameters, carries out data processing in accordance with the commands which are input from an external source and using said respective, accompanying parameters and comprises:

data buffer means for storing one or more commands and/or one or more respective, accompanying parameters, prefetch control means for controlling a prefetch operation of prefetching data, including a command and/or one or more parameters from said external source and supplying said prefetched data to said data buffer means, said data buffer means storing each said command and respective, accompanying parameter as supplied thereto by said prefetch control means until being read out therefrom, and execution means for inputting therein the oldest one of the commands, as currently stored in said data buffer means, upon completing the execution of a preceding command and for reading out, and inputting therein, each of the respective, accompanying one or more parameters stored in said data buffer means when the respective command, as input therein, requests the respective, accompanying parameters, and for executing the command, as input therein, using the respective, accompanying parameters when requested by the respective command and accordingly input therein, said execution means having a first port, connected to a first bus through said prefetch control means, for inputting said commands and respective, accompanying parameters, and a second port, connected to a second bus, for outputting results of the execution.

30. A scalar data processing system for carrying out data processing, in accordance with one or more commands and using one or more parameters accompanying respective said commands, as input thereto from an external source, comprising:

a command and parameter memory;

a data processing device which inputs said commands and parameters from said external source thereof and carries out data processing in accordance with the commands which are input thereto, using said respective, accompanying parameters, and comprising:

data buffer means for storing one or more commands and/or one or more respective, accompanying parameters, until each of said commands and/or one or more said respective, accompanying parameters is read out therefrom, prefetch control means for controlling a prefetch operation of prefetching data, including a command and/or one or more parameters from said external source and supplying same to said data buffer means, said data buffer means storing each said command and/or respective, one or more accompanying parameters as supplied thereto by said prefetch control means until being read out therefrom, and execution means for inputting therein the oldest one of the commands, as currently stored in said data buffer means, upon completing the execution of a preceding command and for reading out, and inputting therein, each of the respective, accompanying one or more parameters stored in said data buffer means when the respective command, as input therein, requests the respective, accompanying one or more parameters, and for executing the command, as input therein, using the respective, accompanying one or more parameters when requested by the respective command and accordingly input therein and wherein, when successive parameter sets, each comprised of one or more parameters, are used in respective, successive executions of a respective command in the execution means, the command is stored in said command and parameter memory, followed by the respective, successive parameter sets which are respectively used in the successive executions of the command;

said command contains information on the number of said parameter sets and information on the data length of each of said parameter sets;

command decode means for decoding the command input into the execution means and for detecting therefrom said number of respective parameter sets and the data length of each;

data length counting means for counting the length of the data of, and thereby for detecting an end of, each of said prefetched parameter sets; and parameter set number counting means for counting the number of parameter sets which are prefetched into said data buffer thereby for determining whether a command has been prefetched or a parameter set has been prefetched, and whether or not each parameter set accompanying and following a respective command has been prefetched.

31. A scalar data processing system according to claim 30, further comprising:

parameter number first-in, first-out means for inputting the number count of said parameter set number counting means and for outputting its own oldest number count content and thereby for holding a number count indicating the parameter set which is currently in execution; and executing parameter number register means for receiving and holding the number count, output by the parameter number first-in, first-out means and, in response to an input of a new parameter set into said execution means, for being renewed thereby.

32. A scalar data processing system according to claim 30, wherein said data buffer means further comprises a first-in, first-out memory into which prefetched commands and respective, accompanying parameters are input, in the order in which said prefetched commands and said respective, accompanying parameters are prefetched.

33. A scalar data processing system according to claim 30, wherein:

said data buffer means further comprises command buffer means for temporarily storing said prefetched commands and parameter buffer means for temporarily storing said prefetched parameters; and said data processing system further comprises command buffer input control means for controlling the input of a prefetched command into said command buffer means based on the output of said parameter set number counting means and parameter buffer input control means for controlling the input of a prefetched parameter set into said parameter buffer means, based on the outputs of said data length counting means and said parameter set number counting means.

34. A scalar data processing system according to claim 30, wherein:

said prefetch control means further comprises an address generating means for obtaining an address for prefetching a command or a parameter, a command address first-in, first-out means and an executing command address register means; and said command address first-in, first-out means, further, inputs the output of said address generating means and outputs its own oldest content into said executing command address register means thereby for holding the address of a command which is currently in execution, the content of said executing command address register means being renewed in response to an input of a new command into said execution means.

35. A scalar data processing system according to claim 30, wherein said prefetch control means comprises command register means for temporarily holding a prefetched command and said command register means further comprises:

command first-in, first-out means for inputting the output of said command register means and for outputting its own oldest content into said executing command register means; and executing command register means for holding a command which is currently in execution, the content of said executing command register means being renewed in response to an input of a new command into said execution means.

36. A scalar data processing system according to claim 30, wherein:

said command and parameter memory stores said commands and parameters in the order the commands are executed and the parameters are used in the data processing device; and said command further contains information on a format of the parameter sets accompanying the command.

37. A scalar data processing system according to claim 36, wherein said command decode means, further, detects the format of said parameter sets, further comprising data length counting means for counting the number of operations of prefetching said parameter sets.

38. A scalar data processing device for carrying out data processing, in accordance with one or more commands which are input from a source external of said device and using one or more parameters selectively accompanying, and which is or are input with, respective said commands, comprising:

data buffer means for storing one or more commands and/or one or more accompanying parameters;

execution means for inputting therein the oldest one of the commands, as currently stored in said data buffer means, upon completing the execution of a preceding command and for reading out from said data buffer memory, and for inputting therein, each of the accompanying one or more parameters stored in said data buffer means when the respective command, as input therein, requests the one or more accompanying parameters, and for executing the command, as input therein, using the respective, accompanying parameters when requested by the respective command and accordingly input therein;

insufficient space detecting means for detecting a first state of said data buffer means in which first state there is not enough vacant space in the data buffer means in which a further command and/or a parameter can be stored;

least data detecting means for detecting a second state of said data buffer means in which second state the data buffer means does not store data, the data including a command and/or a parameter and which is to be used in a next operation of said execution means;

command decode means for decoding the command which is input into the execution means and for detecting said number of respective, accompanying parameter sets and the data length of each of the respective, accompanying parameter sets, as contained in the command;

data length counting means for counting the length of the prefetched data thereby to detect the end of each of said prefetched parameter sets; and parameter set number counting means for counting the number of parameter sets which are prefetched into said data buffer thereby for determining whether a command has been prefetched or a parameter set has been prefetched, and whether or not each parameter set, accompanying a respective command, has been prefetched.

39. A scalar data processing device according to claim 38, further comprising:

a command and parameter memory for storing said commands and respective, accompanying parameters in the order in which the commands are executed and the respective, accompanying parameters are used in the execution means; and prefetch control means for controlling a prefetch operation of data, the data including a command and/or a parameter from an external source, into said data buffer means, said prefetch control means starting said prefetch operation and continuing successive prefetch operations when said second state is detected, and stopping the prefetch operation when said first state is detected.

40. A scalar data processing device according to claim 39, wherein said prefetch control means further comprises a branch command detecting means for detecting a branch command in the prefetched commands, said prefetch control means, further and in response thereto, stopping the prefetch operation until the result of the execution of said branch command is obtained in said execution means.

41. A scalar data processing device according to claim 39, wherein:

said prefetch control means comprises an address generating means for supplying an address for prefetching, selectively, one of a command and a parameter;

said address calculation means comprises an address generating means, a command address first-in, first-out means and an executing command address register means; and said command address first-in, first-out means, further, inputs the output of said address calculation means and outputs its own oldest content into said executing command address register means thereby for holding the address of a command which is currently in execution, the content of said executing command address register means being renewed in response to an input of a new command into said execution means.

42. A scalar data processing device according to claim 39, wherein said prefetch control means further comprises:

command register means for temporarily holding a prefetched command;

command first-in, first-out means for inputting the output of said command register means and for outputting its own oldest content into said executing command register means; and executing command register means for holding a command which is currently in execution, the content of said executing command register means being renewed in response to an input of a new command into said execution means.

43. A scalar data processing device according to claim 39, further comprising:

means responsive to a requirement of performing successive executions of a command and wherein successive command executions uses respective, accompanying parameter sets, each parameter set comprising one or more parameters, for storing the command in said command and parameter memory, followed by the respective parameter sets used in the successive executions of the command; and said command contains information as to the format of the parameter sets accompanying the command, the number of said parameter sets, and the data length of each of the parameter sets.

44. A scalar data processing device according to claim 43, further comprising:

command decode means for detecting the format of each of said accompanying parameter sets; and data length counting means for counting the number of operations of prefetching the accompanying parameter sets.

45. A scalar data processing device according to claim 38, further comprising:

a command and parameter memory which stores said prefetched commands and respective, accompanying parameters in the order in which the commands are to be executed and the respective, accompanying parameters are used in the execution of the respective commands by the data processing device;

a prefetch control means, provided externally of said data processing device, for controlling a prefetch operation of data, including a command and/or a parameter from the external source into said data buffer means, said prefetch control means starting said prefetch operation and continuing successive prefetch operations when said second state is detected, and stopping the prefetch operation when said first state is detected; and means, responsive to a requirement of performing successive executions of a command and wherein each of which successive command executions uses a respective parameter set of one or more parameters, for storing the command in said command and parameter memory, followed by each of the associated parameter sets which are used in the successive executions of the respective command, and wherein said command contains information as to the number of, and as to the data length of each of, said respective, accompanying parameter sets.

46. A scalar data processing device according to claim 38, further comprising:

parameter number first-in, first-out means for inputting the number count of said parameter set number counting means and for outputting its own oldest number count content and thereby for holding a number count indicating the parameter set which is currently in execution; and executing parameter number register means for receiving and holding the number count, output by the parameter number first-in, first-out means, and responsive to an input of a new parameter set into said execution means for being renewed thereby.

47. A scalar data processing device according to claim 38, wherein said data buffer further comprises a first-in, first-out memory into which prefetched commands and respective, accompanying parameters are input, in the order in which said prefetched commands and respective, accompanying parameters are prefetched.

48. A scalar data processing device according to claim 42, wherein:

said insufficient space detecting means comprises means for incrementing a count responding to a prefetch of every unit length of commands and accompanying parameters for detecting an amount of data currently held in the data buffer means, and for decrementing the count responding to an input of every unit length of command and accompanying parameters into said execution means; and said least data detecting means comprises means for incrementing a count when a command which is not followed by an accompanying parameter is prefetched and when each parameter set is prefetched, and for decrementing the count when a command which is not followed by an accompanying parameter is input into said execution means and when each parameter set is input into said execution means.

49. A scalar data processing device according to claim 38, wherein:

said data buffer means further comprises command buffer means for temporarily storing said prefetched commands and parameter buffer means for temporarily storing said prefetched parameters; and said data processing device further comprises command buffer input control means for controlling the input of a prefetched command into said command buffer means based on the output of said parameter set number counting means and parameter buffer input control means for controlling the input of a prefetched parameter set into said parameter buffer means, based on the outputs of said data length counting means and said parameter set number counting means.

50. A scalar data processing device according to claim 49, wherein:

said insufficient space detecting means further comprises:

command buffer amount counter means for incrementing the count thereof in response to every prefetch of a command, decrementing the count thereof in response to every input of a command into said execution means and detecting a third state wherein insufficient vacant space exists in the command buffer means for storing a further command, parameter buffer amount counter means for incrementing the count thereof in response to every prefetch of a unit length of parameters, and decrementing the count thereof in response to every input of a unit length of parameters into said execution means, and detecting a fourth state wherein insufficient vacant space exists in the parameter command buffer means for storing a further parameter, and logical OR means for detecting one of said third and fourth states; and said least data detecting means comprises means for incrementing a count when a command having no accompanying parameter is prefetched and when each parameter set is prefetched, and for decrementing the count when a command having no accompanying parameter is input into said execution means and when each parameter set is input into said execution means.

51. A scalar data processing device according to claim 38, wherein said execution means further comprises a first port, connected to a first bus through said prefetch control means, for inputting said commands and respective, accompanying parameters, and a second port, connected to a second bus, for outputting results of the execution on the second bus.

52. A scalar data processing device as recited in claim 38, wherein said data processor device is connected to said source through a bus, further comprising:

bus grant obtaining means for obtaining a grant of use of said bus, and said bus grant obtaining means being activated in response to said detection of the second state by the least data detection means.

53. A scalar data processing device according to claim 39 wherein:

said prefetch control means controls a prefetch operation of data, including a command and/or a parameter, from outside of said device into said data buffer means; and said prefetch control means further comprises branch command detecting means for detecting a branch command, as one of the prefetched commands, said prefetch control means responding to the detection of a prefetched branch command for stopping further said prefetch operations thereof until completion of the execution of said branch command by said execution means.

54. A scalar data processing device for carrying out data processing, in accordance with data input thereto from a source external of said device, the data comprising one or more commands and one or more parameters which may accompany respective said commands and further comprising a branch command, the data processing device comprising:

data buffer means for storing one or more of said commands and/or one or more of said accompanying parameters, until each of said stored commands and accompanying parameters is read out therefrom;

prefetch control means for controlling a prefetch operation of prefetching data, including a command and/or one or more accompanying parameters, from said external source and supplying same to said data buffer means, said data buffer means storing each said prefetched command and parameter, as supplied thereto by said prefetch control means, until read out therefrom;

execution means for reading out from said data buffer means and inputting therein the oldest one of the prefetched commands, as currently stored in said data buffer means and upon completing the execution of a preceding command, and for reading out from said data buffer means and inputting therein each of the one or more prefetched, accompanying parameters of the oldest one of the prefetched command and currently stored in said data buffer means when the command, as input therein, requests the respective, accompanying one or more parameters, and for executing the command, as input therein, using the respective, accompanying parameters requested by the respective command and accordingly input therein;

insufficient space detecting means for detecting a first state of said data buffer means in which first state there is not enough vacant space in the data buffer means in which a further, prefetched command and/or parameter can be stored;

least data detecting means for detecting a second state of said data buffer means in which second state the data buffer means does not store data, including a command and/or a parameter, which is necessary for a next operation of said execution means;

said prefetch control means, in response to the detection of said second state by said second state detecting means, starting said prefetch operation and continuing successive said prefetch operations until said first detecting means detects said first state and, further, in response to the detection of said second state, stopping further said prefetch operations; and said prefetch control means further comprises branch command detecting means for detecting a branch command, as one of the prefetched commands, said prefetch control means responding to the detection of a prefetched branch command for stopping further prefetch operations thereof until completion of the execution of said branch command by said execution means.

55. A scalar data processing device according to claim 54, further comprising a command and parameter memory for storing said commands and accompanying parameters in the order in which the commands are executed, and in which the accompanying parameters are used in the execution of each respective command, by the execution means.

* * * * *

UNITED STATES PATENT AND TRADEMARK OFFICE
CERTIFICATE OF CORRECTION

PATENT NO. : 5,655,114
DATED : Aug. 5, 1997
INVENTOR(S) : TANIAI et al.

It is certified that error appears in the above-identified patent and that said Letters Patent is hereby corrected as shown below:

TITLE PAGE ITEMS,

[63] Related U.S. Application Data, change "Oct. 29, 1979" to --Oct. 29, 1992--.

[56] References Cited, under OTHER PUBLICATIONS, insert the following:

> Veneski et al., "Asynchronous Pipelined Instruction Prefetch Mechanism," <u>IBM TECHNICAL DISCLOSURE BULLETIN</u>, Vol. 25, No. 9, February 1983, New York, NY, pages 4722-4727.
>
> S. Iacobovici, "A Pipelined Interface for High Floating-Point Performance with Precise Exceptions," <u>IEEE MICRO</u>, Vol. 8, No. 3, June 1988, New York, NY, pages 77-87.

[57] Abstract, line 1, change "art" to --an--;
line 19, delete "in" (first occurrence).

Col. 2, line 52, after "the pairs" insert --,--.

Col. 4, line 8, after "execution," insert --and--;
line 30, after "initialization" insert --data--.

Col. 6, line 15, after "form" insert --,--; and change "from, the the" to --from the--.

Col. 7, line 23, delete "the" (third occurrence);
line 25, delete "the" (second occurrence).

Col. 8, line 9, change "($X_{sO}$, $Y_{sO}$)" to --($X_{SO}$, $Y_{SO}$)--;
line 10, change "($X_{eO}$, $Y_{eO}$)" to --($X_{EO}$, $Y_{EO}$)--;
line 43, change "the the" to --the--.

Col. 9, line 3, change "($X_{sO}$, $Y_{sO}$)" to --($X_{SO}$, $Y_{SO}$)--;
line 4, change "($X_{eO}$, $Y_{eO}$)" to --($X_{EO}$, $Y_{EO}$)--.

UNITED STATES PATENT AND TRADEMARK OFFICE
CERTIFICATE OF CORRECTION

PATENT NO. : 5,655,114
DATED : Aug. 5, 1997
INVENTOR(S) : TANIAI et al.

Page 2 of 2

It is certified that error appears in the above-identified patent and that said Letters Patent is hereby corrected as shown below:

Col. 17, line 63, after "word" delete ",";
line 64, after "word" insert --,--.

Col. 19, line 38, change "written based, on" to --written, based on--;
line 43, after "reset" insert --,--.

Col. 22, line 16, after "parameter set" insert --P41--;
line 41, after "parameter" insert --C4--.

Col. 26, line 26, change "storing a width" to --storing the width--.

Col. 32, line 4 (Claim 14, line 14), delete "which";
line 8 (Claim 14, line 18), delete ", for decrementing";
line 9 (Claim 14, line 19), delete "the count".

Col. 40, line 36 (Claim 43, line 3), after "means" insert --,--.

Signed and Sealed this

Ninth Day of December, 1997

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,655,114 Page 1 of 1
DATED : August 5, 1997
INVENTOR(S) : Taniai et al.

It is certified that error appears in the above-identified patent and that said Letters Patent is hereby corrected as shown below:

Column 28,
Line 62, change "second state" to -- least data --;
Line 64, change "first" to -- insufficient space --;
Line 66, change "second" to -- first --.

Column 30,
Line 60, change "second state" to -- least data --;
Line 62, change "first" to -- insufficient space --;
Line 64, change "second" to -- first --.

Column 44,
Line 5, change "second state" to -- least data --;
Line 7, change "first" to -- insufficient space --;
Line 9, change "second" to -- first --.

Signed and Sealed this

Twenty-seventh Day of April, 2004

JON W. DUDAS
*Acting Director of the United States Patent and Trademark Office*